(12) United States Patent
Chin

(10) Patent No.: US 7,882,880 B2
(45) Date of Patent: Feb. 8, 2011

(54) LAMINATING APPARATUS MOUNTED WITH IMPROVED MECHANISM

(75) Inventor: Hiroyoshi Chin, Kanagawa-Ken (JP)

(73) Assignee: Victor Company of Japan, Limited, Kanagawa-ku (JP)

( * ) Notice: Subject to any disclaimer, the term of this patent is extended or adjusted under 35 U.S.C. 154(b) by 729 days.

(21) Appl. No.: 11/696,450

(22) Filed: Apr. 4, 2007

(65) Prior Publication Data

US 2007/0235141 A1    Oct. 11, 2007

(30) Foreign Application Priority Data

Apr. 6, 2006    (JP)    ............................. 2006-105074

(51) Int. Cl.
*B32B 37/22*    (2006.01)
(52) U.S. Cl. ........................ 156/552; 156/583.1; 492/42
(58) Field of Classification Search ................. 156/552, 156/583.1; 492/42; 242/129.6, 130, 130.1
See application file for complete search history.

(56) References Cited

U.S. PATENT DOCUMENTS 3,096,101 A * 7/1963 Raddeman ..................... 281/8

FOREIGN PATENT DOCUMENTS

JP        2001-105493        4/2001

* cited by examiner

Primary Examiner—George R Koch, III
(74) Attorney, Agent, or Firm—Connolly Bove Lodge & Hutz LLP

(57) ABSTRACT

A laminating apparatus is composed of a thermo compression bonding section, a first bobbin holder and a second bobbin holder. The thermo compression bonding section pulls a laminating film having a member for forming a protective film out from a roll of the laminating film, which is wrapped around a core bobbin in a cylindrical shape, and overlaps the protective film on one surface of a card and thermally compresses the protective film against the one surface of the card so as to be bonded. The first bobbin holder includes a reel shaft, a fixed section having a plurality of contacting surface sections, which is fixed to the reel shaft and formed in different positions in a direction along the reel shaft, a movable section, which can selectively contact with one of the plurality of contacting surface sections of the fixed section so as to be movable along the reel shaft, and a mechanism, which links the movable section to the fixed section and is capable of controlling positional fluctuation of a protective film to be bonded on a card. The second bobbin holder includes a shaft and a holder section, which is movable along the shaft and braced up toward the movable section, wherein the first and second bobbin holders support the core bobbin at both end portions respectively so as to be rotatable around an axis of revolution of the core bobbin, and wherein the core bobbin is supported by the movable section and the holder section with being sandwiched between them.

2 Claims, 14 Drawing Sheets

LAMINATING APPARATUS MOUNTED WITH IMPROVED MECHANISM

BACKGROUND OF THE INVENTION

1. Field of the Invention

The present invention relates to a laminating apparatus for laminating a protective film on a surface of a card, particularly, relates to a laminating apparatus mounted with an improved mechanism for controlling positional fluctuation of a protective film accurately.

2. Description of the Related Art

As a full-blown card era has come, various kinds of cards have normally been used in daily life. Such a card is, for example, a card of which surface is printed with specific information, a magnetic card such as a telephone card, and an IC card in which an IC memory chip is installed as represented by a credit card. In case of applications for identifying a person, an image such as a facial portrait of the person is printed on a surface of a card.

It is often the case that those various kinds of cards are laminated with a protective film on their surfaces so as to protect their surfaces from scratching or stain, or so as to prevent information printed thereon from being altered.

More specifically, by thermally compression bonding a transparent film in ribbon shape having a thickness of approximately 30 μm to 50 μm on a surface of a card, which was previously printed with information, the transparent film is bonded on the surface of the card and results in a protective film.

One of laminating apparatuses for conducting the laminating process is disclosed in the Japanese publication of unexamined patent applications No. 2001-105493.

The laminating apparatus disclosed in the Japanese publication of unexamined patent applications No. 2001-105493 laminates a protective body (laminating film), which is formed with a resin layer to be a protective layer on a substrate such as PET (polyethylene terephthalate), on a surface of a recording medium such as a card, which is made from plastic or wood free paper through a thermo compression bonding process by means of a heat roller, and resulting in laminating the resin layer on the surface of the card.

With respect to the other methods of laminating, there existed a method such that a substrate of a laminating film itself was bonded on a surface of a card and the substrate resulted in a protective film.

In this case, the laminating film is constituted by a substrate and an adhesive layer, and the substrate is previously cut halfway along a border line of an area to be bonded, that is, contour of a card normally.

Then, after the laminating process is conducted, a part of the laminating film, which was not bonded on a card, is separated from the laminating film such a way that the part is cut off along the halfway cut portion.

Further, there existed another type of laminating film that is formed in a roll shape (hereinafter referred to as rolled laminating film), wherein a precut patch (protective film) made of a transparent film is affixed on a carrier or board (substrate) for transportation at certain intervals. A sensor mark is marked on the carrier of the rolled laminating film so as to distinguish a position of the patch.

In a laminating apparatus, which laminates a patch on a card by using such a rolled laminating film, a sensor detects the sensor mark first before conducting a laminating operation. The laminating apparatus conducts a thermo compression bonding method, wherein a precut patch is heated while determining a position of the precut patch, the heated patch is compression-bonded on a platen roller, the patch alone is separated from a carrier, and then the separated patch is thermally compression-bonded on a surface of a card that is previously printed.

In the case of such a rolled laminating film, it is possible to laminate a patch on a card in succession.

In the meantime, in case a patch is affixed on a rolled laminating film at certain intervals, a position of each patch is almost constant with respect to a carrier. However, it possibly occurs that a position of a patch is shifted in certain degree of fluctuation across production bathes as long as a rolled laminating film is an industrial product. It is experientially known that such fluctuation is small within one roll of laminating film but rather large across respective rolls of laminating films.

With referring to FIGS. 16 and 17, description is given to positional fluctuation of a patch that is affixed on a rolled laminating film.

FIG. 16 is a pattern diagram of a rolled laminating film showing positional fluctuation of a patch in a direction of the rolled laminating film to be taken up or in a longitudinal direction of the rolled laminating film.

FIG. 17 is a pattern diagram of a rolled laminating film showing positional fluctuation of a patch in a direction intersecting at right angles to a longitudinal direction of the rolled laminating film to be taken up or in a lateral direction of the rolled laminating film.

In FIG. 16, a patch (protective film) 1203 is affixed on a carrier (substrate) 1203C at certain intervals in a longitudinal direction of the carrier 1203C.

Further, a sensor mark 1201 is provided on a side edge portion of the carrier 1203C in relation to each patch 1203.

Furthermore, in FIG. 16, doted lines 1202 denote a normal position of a patch 1203 to be affixed therein, wherein a distance from the sensor mark 1201 to the normal position of the patch 1203 is denoted by an arrow 1204, and a shifting amount of positional fluctuation of a patch 1203 in the longitudinal direction of the rolled laminating film is denoted by another arrow 1205.

In FIG. 17, a patch 1303 is affixed on a carrier 1303C at certain intervals in a longitudinal direction of the carrier 1303C as the same manner as the patch 1203 shown in FIG. 16.

Further, a sensor mark 1301 is provided on a side edge portion of the carrier 1303C in relation to each patch 1303.

Furthermore, in FIG. 17, doted lines 1302 denote a normal position of the patch 1303 to be affixed therein, wherein a distance from the sensor mark 1301 to the normal position of the patch 1303 is denoted by an arrow 1304, and a shifting amount of positional fluctuation of the patch 1303 in a lateral direction intersecting at right angles to the longitudinal direction of the rolled laminating film is denoted by another arrow 1305.

If a patch of which position is shifted from a normal position as mentioned above, is laminated on a card, then a laminating position of the patch with respect to the card is shifted across production batches.

It is commonly adopted as a method of adjusting positional fluctuation of the patch 1203 in the longitudinal direction of the rolled laminating film that a shifting amount 1205 of positional fluctuation of a patch 1203 is obtained by detecting an edge portion 1203A in the longitudinal direction of the patch 1203 by means of a sensor, and then a stopping position of the carrier 1203C or a card is controlled so as to cancel the shifting amount 1205.

On the other hand, with respect to positional fluctuation of a patch 1303 in the lateral direction, a shifting amount of positional fluctuation of a patch is approximately constant within one roll of laminating film, so that a worker visually adjusts insertion depth of a roll of a laminating film when inserting the roll into a supply reel shaft. However, such work depends upon visual estimation and experience of each worker.

Accordingly, there existed a problem such that controlling positional fluctuation through visual estimation and experience is hardly conducted in higher accuracy and stably.

SUMMARY OF THE INVENTION

Accordingly, in consideration of the above-mentioned problem of the prior art, an object of the present invention is to provide a laminating apparatus, which can adjust positional fluctuation of a patch or a protective film in a lateral direction intersecting at right angles to a longitudinal direction of a rolled laminating film in higher accuracy, can make a laminating position of a patch with respect to a card constant, and further can reduce fluctuation of the laminating position of the card.

According to an aspect of the present invention, there provided a laminating apparatus mounted with an improved mechanism comprising: (a) a thermo compression bonding section, wherein the thermo compression bonding section pulls a laminating film having a member for forming a protective film out from a roll of the laminating film, which is wrapped around a core bobbin in a cylindrical shape, and overlaps the protective film on one surface of a card and thermally compresses the protective film against the one surface of the card so as to be bonded; (b) a first bobbin holder, the first bobbin holder including (1) a reel shaft, (2) a fixed section having a plurality of contacting surface sections, which is fixed to the reel shaft and formed in different positions in a direction along the reel shaft, (3) a movable section, which can selectively contact with one of the plurality of contacting surface sections of the fixed section so as to be movable along the reel shaft, and (4) a mechanism, which links the movable section to the fixed section and is capable of controlling positional fluctuation of a protective film to be bonded on a card; and (c) a second bobbin holder, the second bobbin holder including (1) a shaft, and (2) a holder section, which is movable along the shaft and braced up toward the movable section, wherein the first and second bobbin holders support the core bobbin at both end portions respectively so as to be rotatable around an axis of revolution of the core bobbin, and wherein the core bobbin is supported by the movable section and the holder section with being sandwiched between them.

Other object and further features of the present invention will be apparent from the following detailed description when read in conjunction with the accompanying drawings.

DETAILED DESCRIPTION OF THE PREFERRED EMBODIMENTS

First Embodiment

Figure 1:
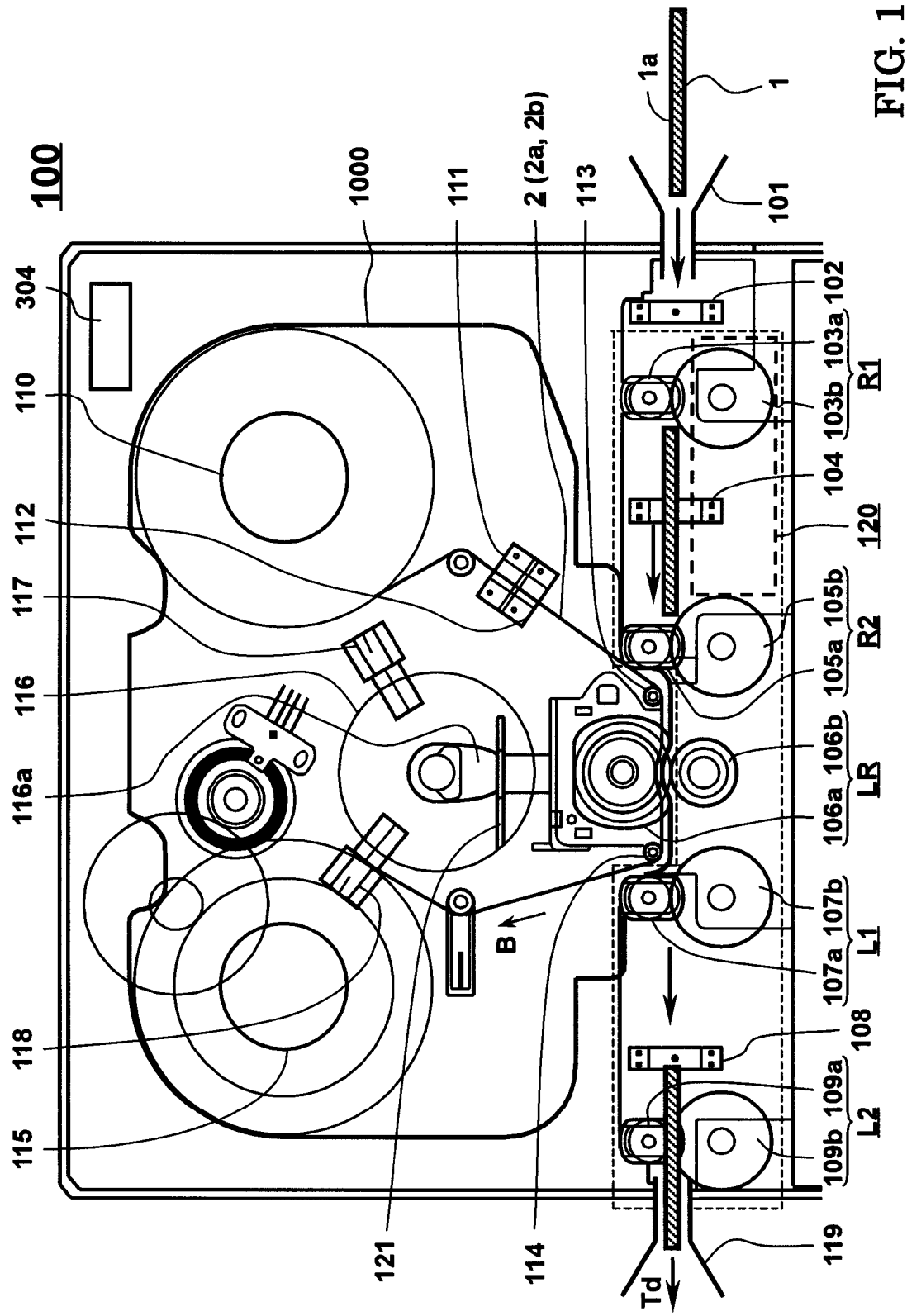
FIG. 1 is a plan view of a laminating apparatus according to a first embodiment of the present invention showing an internal structure.

FIG. 1 is a plan view of a laminating apparatus according to a first embodiment of the present invention showing an internal structure.

Figure 2:
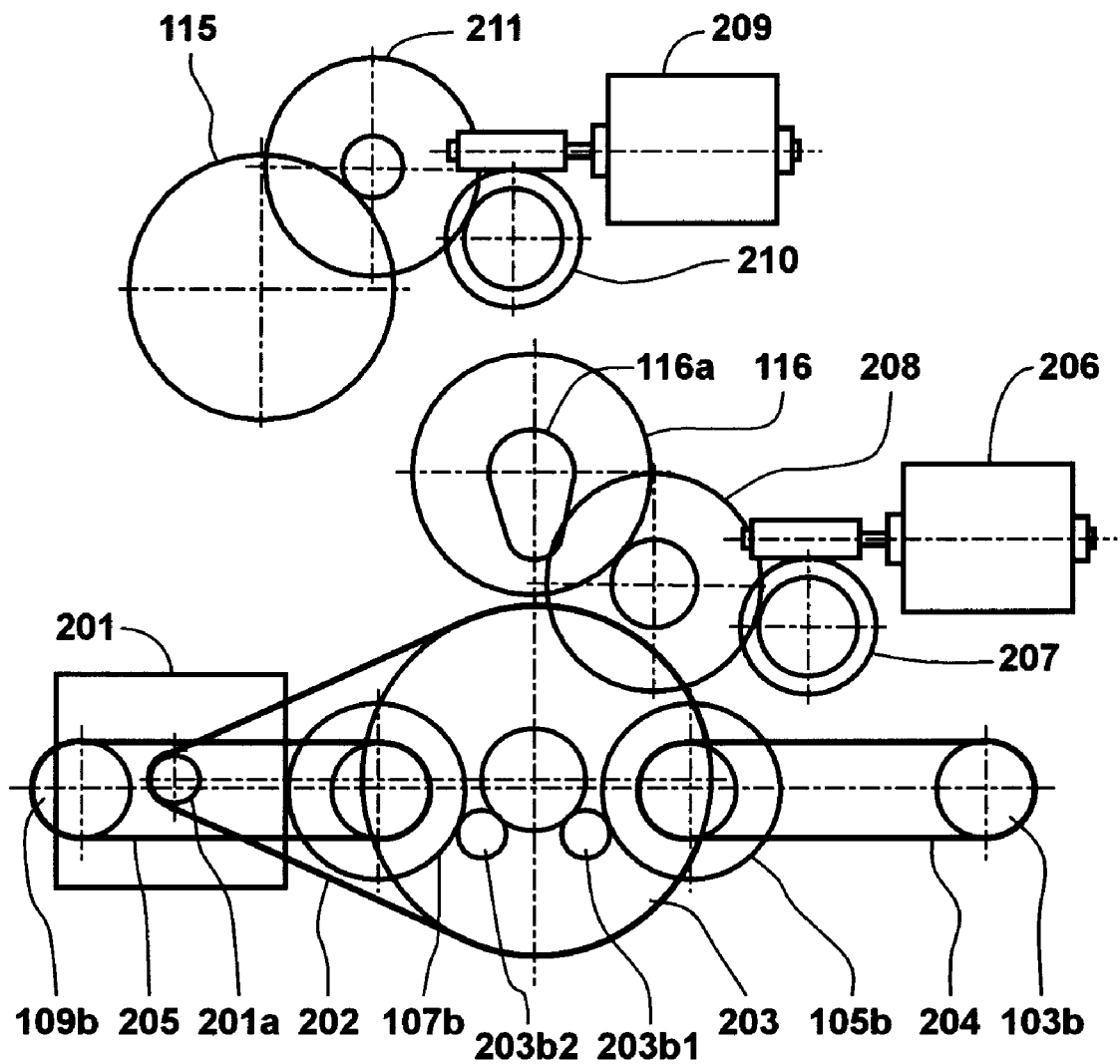
FIG. 2 is a plan view of a driving mechanism adopted in the laminating apparatus shown in FIG. 1.

FIG. 2 is a plan view of a driving mechanism adopted in the laminating apparatus shown in FIG. 1.

Figure 3:
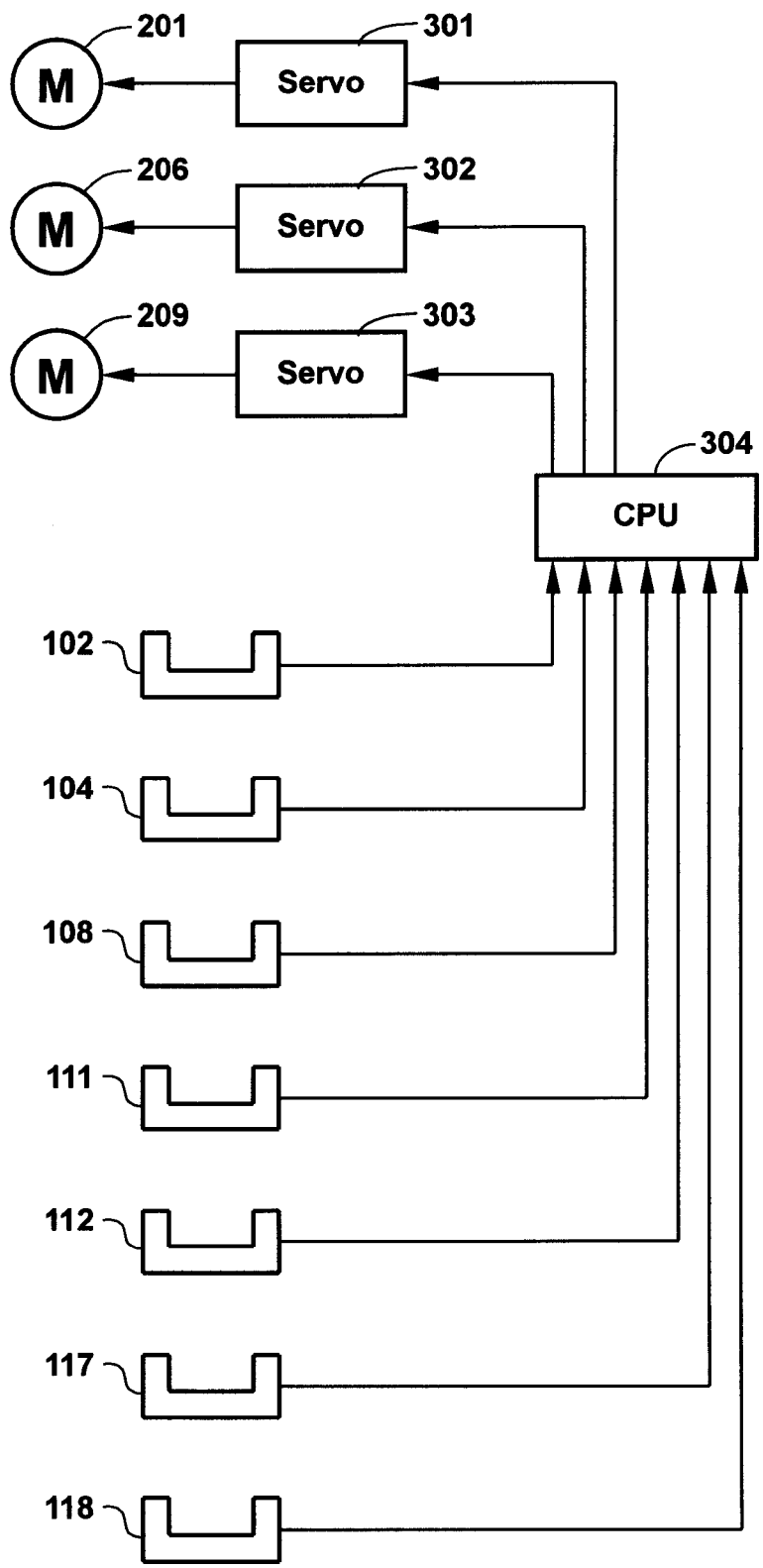
FIG. 3 is an electrical block diagram of the laminating apparatus according to the first embodiment of the present invention.

FIG. 3 is an electrical block diagram of the laminating apparatus according to the first embodiment of the present invention.

Figure 4A:
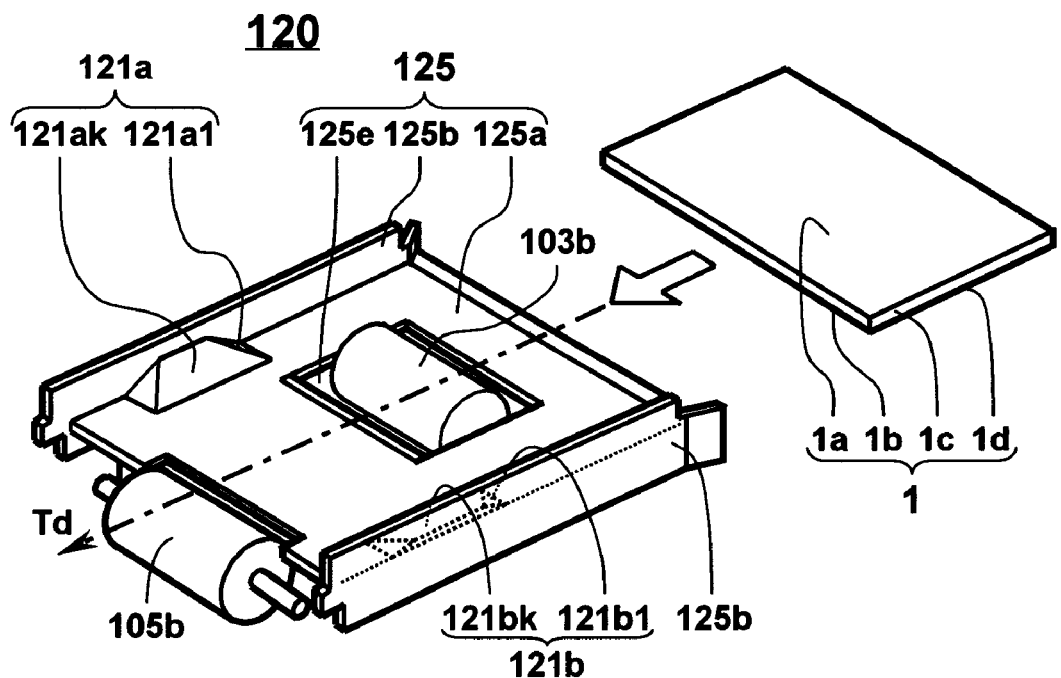
FIG. 4(a) is a perspective view of a major section of the laminating apparatus shown in FIG. 1.

FIG. 4(a) is a perspective view of a major section of the laminating apparatus shown in FIG. 1.

Figure 4B:
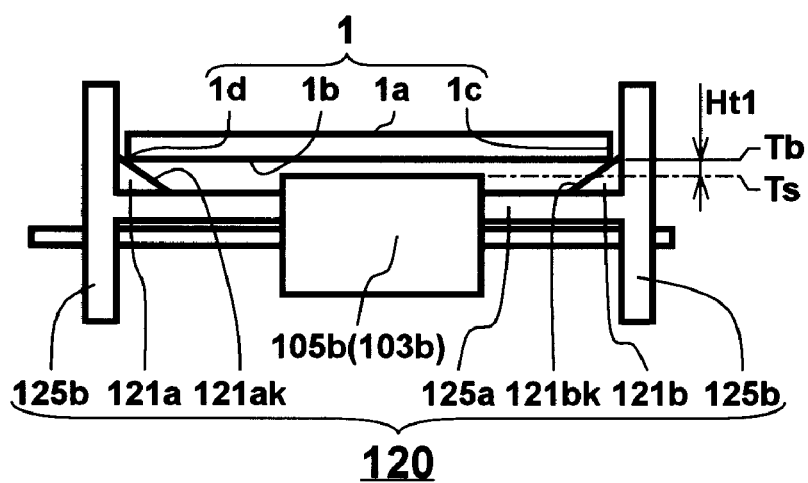
FIG. 4(b) is an end view of the major section of the laminating apparatus viewed from an opposite direction to a card carrying-in direction shown by an arrow in FIG. 4(a).

FIG. 4(b) is an end view of the major section of the laminating apparatus viewed from an opposite direction to a card carrying-in direction shown by an arrow in FIG. 4(a).

Figure 5A:
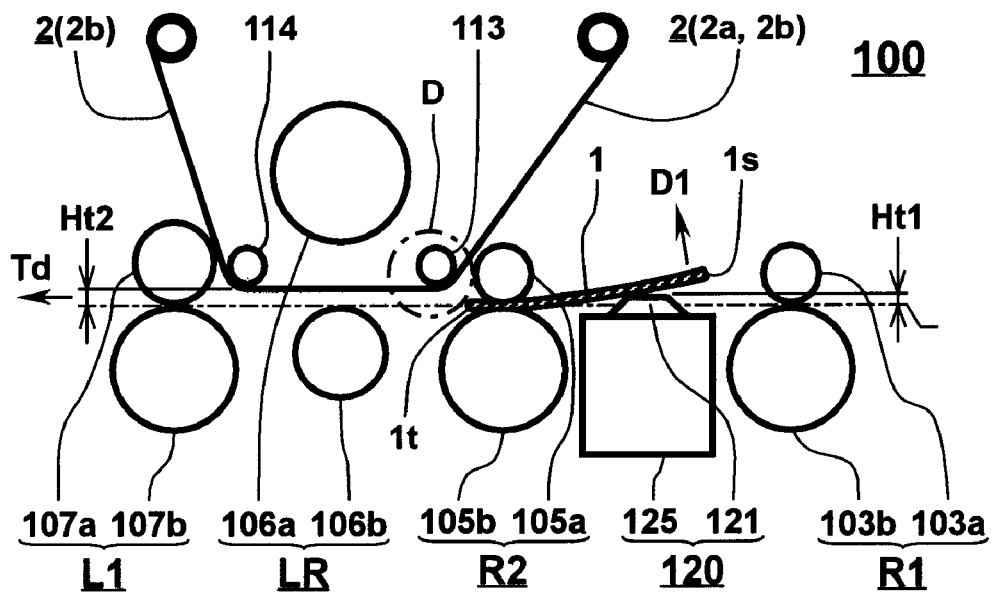
FIG. 5(a) is a diagrammatic cross sectional view of a transporting section of the laminating apparatus shown in FIG. 1.

FIG. 5(a) is a diagrammatic cross sectional view of a transporting section of the laminating apparatus shown in FIG. 1.

Figure 5B:
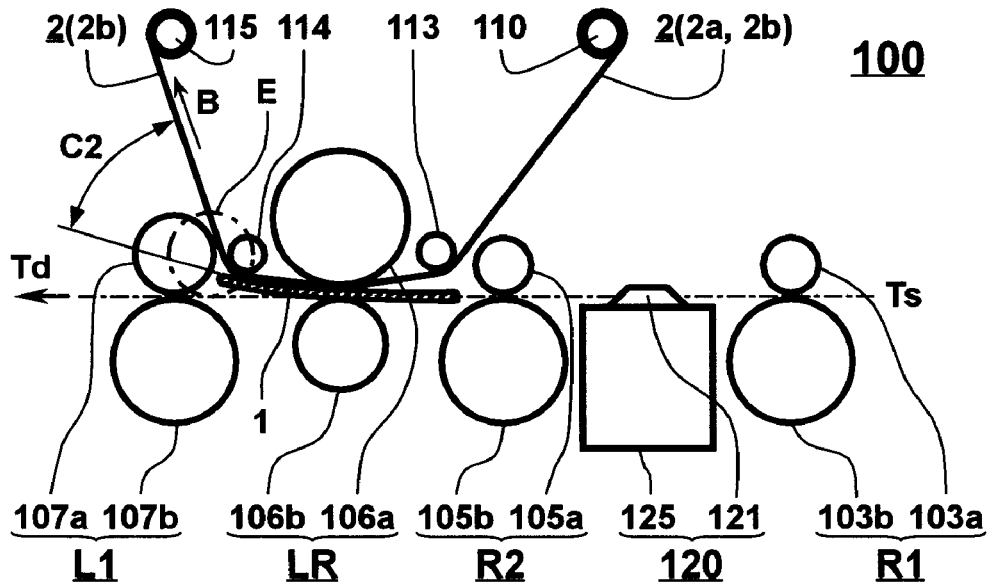
FIG. 5(b) is another diagrammatic cross sectional view of the transporting section of the laminating apparatus shown in FIG. 1.

FIG. 5(b) is another diagrammatic cross sectional view of the transporting section of the laminating apparatus shown in FIG. 1.

Figure 6:
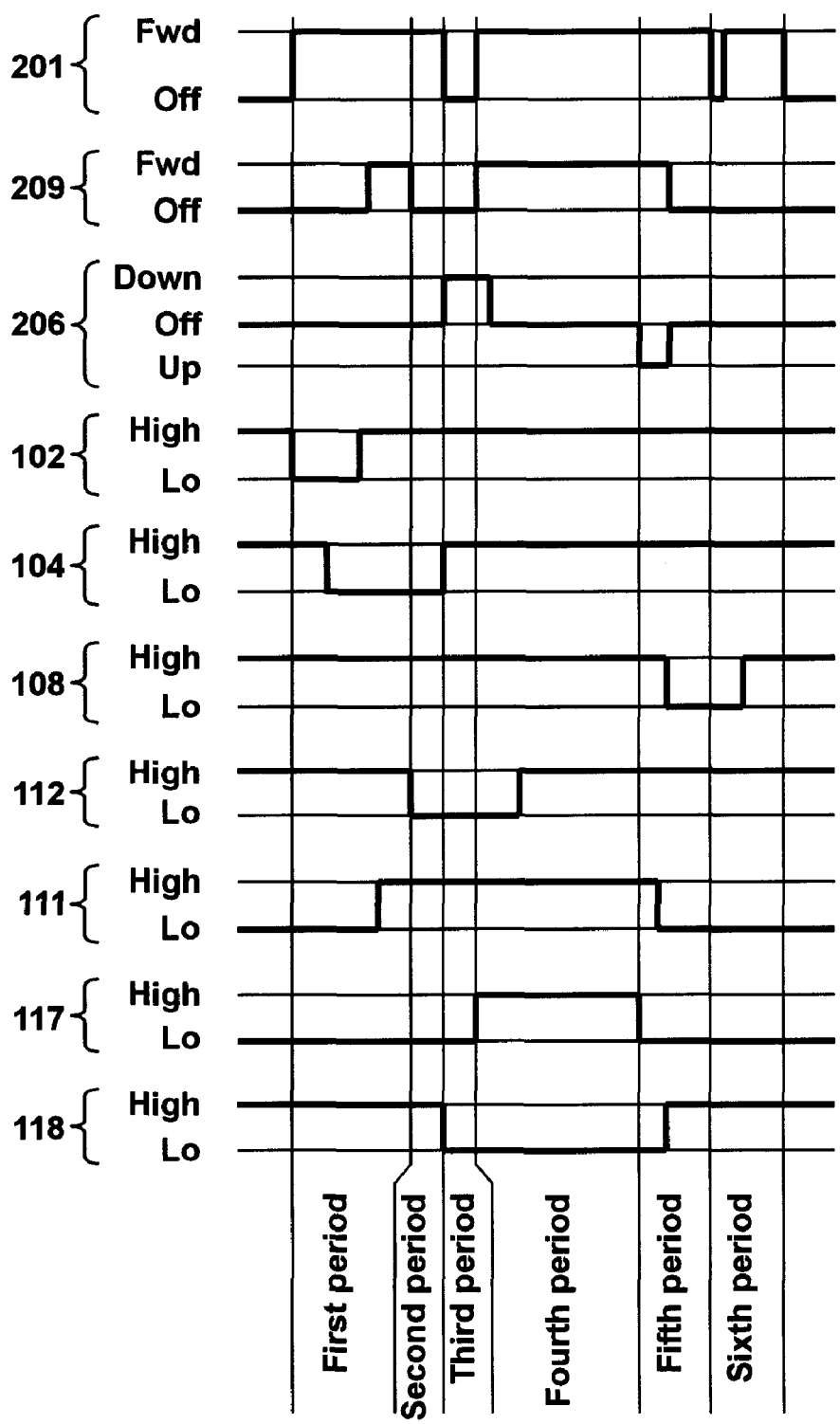
FIG. 6 is a timing chart of each member of the laminating apparatus shown in FIG. 1 according to the first embodiment of the present invention.

FIG. 6 is a timing chart of each member of the laminating apparatus shown in FIG. 1 according to the first embodiment of the present invention.

Figure 7:
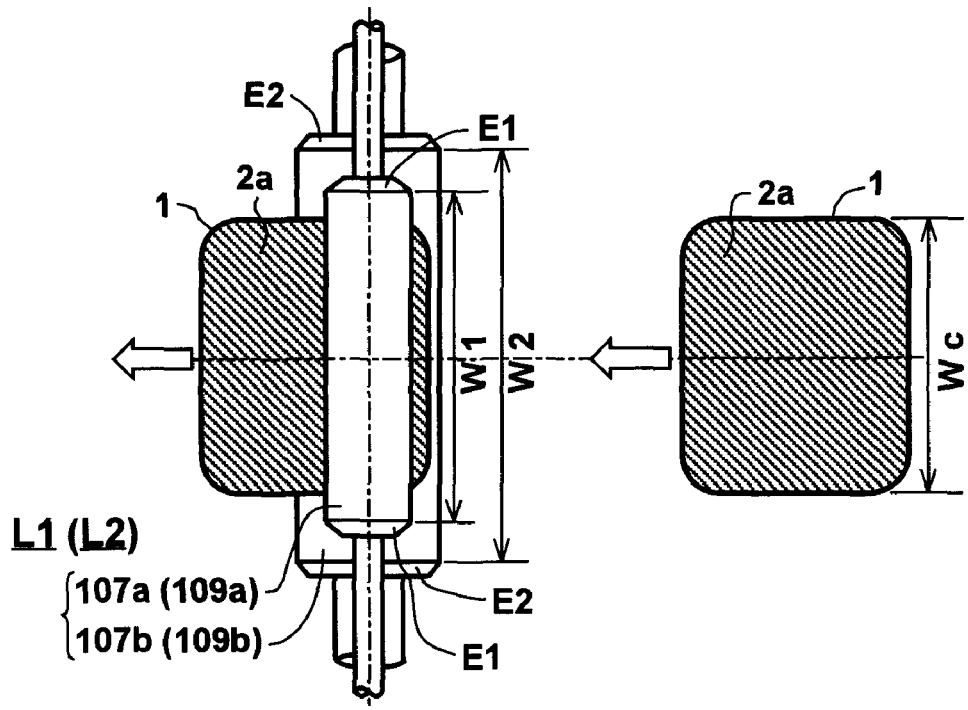
FIG. 7 is a plan view of a card carrying-out section of the laminating apparatus shown in FIG. 1.

FIG. 7 is a plan view of a card carrying-out section of the laminating apparatus shown in FIG. 1.

Figure 9:
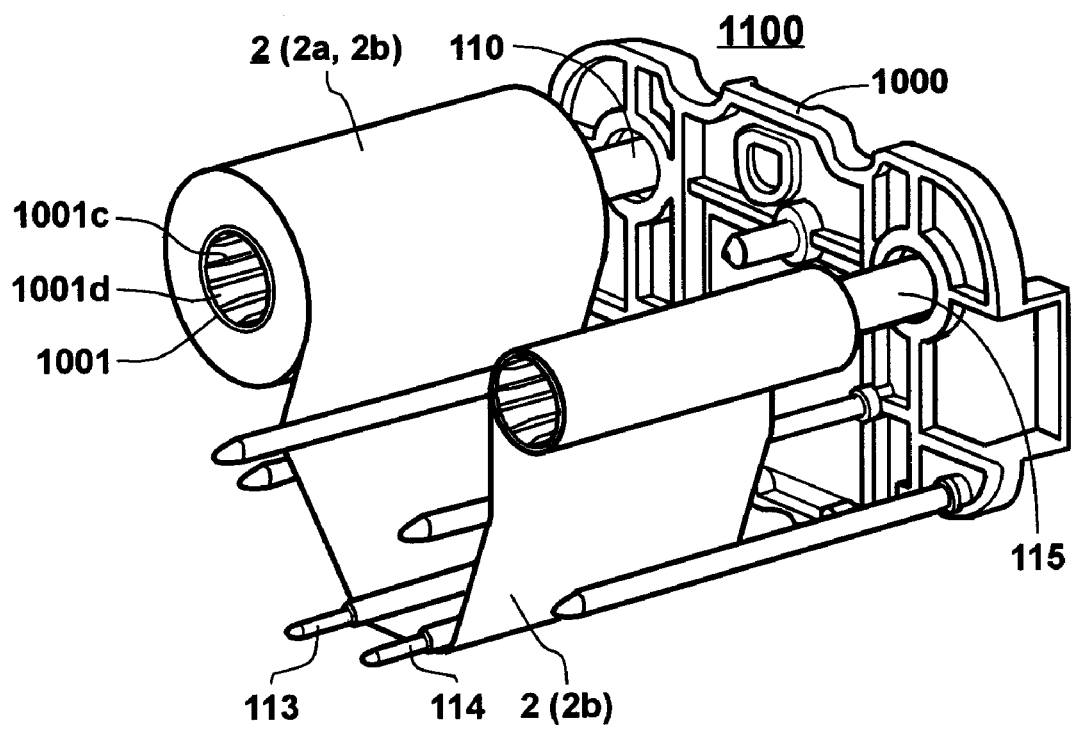
FIG. 9 is a perspective view of a cassette containing a roll of laminating film for the laminating apparatus shown in FIG. 1.

FIG. 9 is a perspective view of a cassette containing a roll of laminating film for the laminating apparatus shown in FIG. 1.

Figure 10:
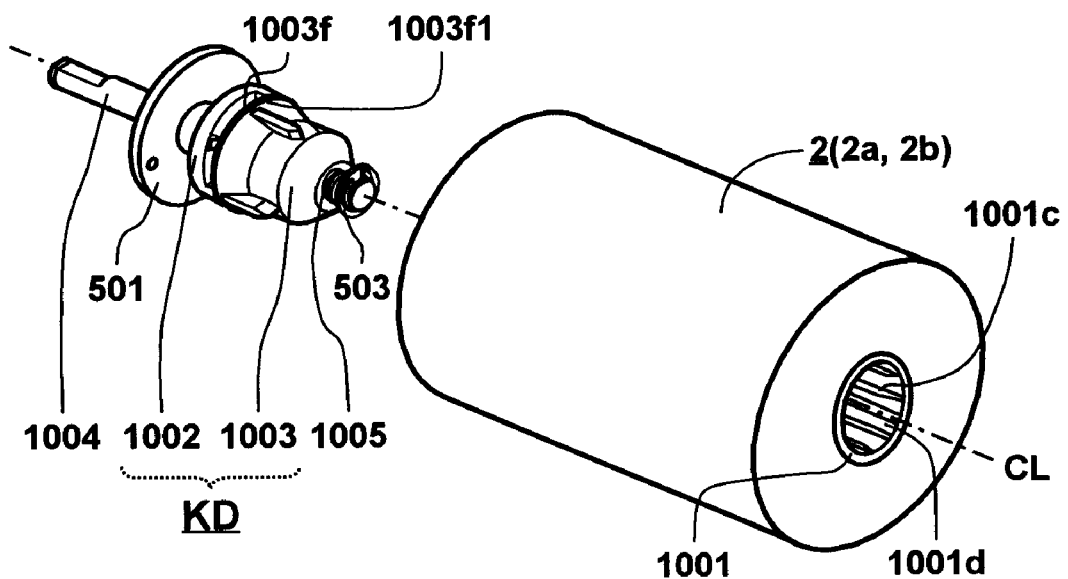
FIG. 10 is a perspective view of a revolution transmitting section of the laminating apparatus shown in FIG. 1.

FIG. 10 is a perspective view of a revolution transmitting section of the laminating apparatus shown in FIG. 1.

Figure 11:
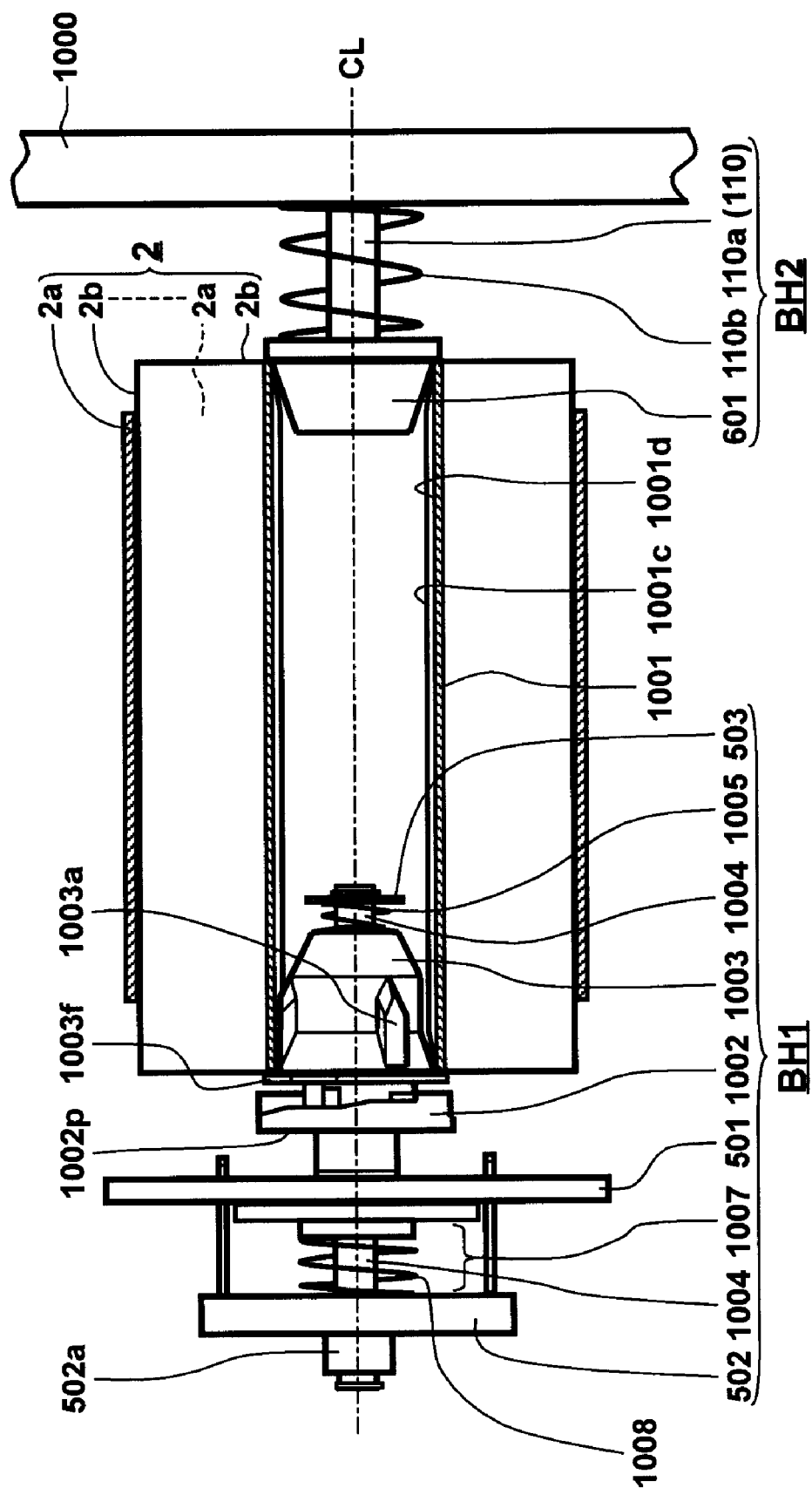
FIG. 11 is a side elevational view, partly in cross section, of bobbin holders supporting the roll of the laminating film shown in FIG. 9 in position.

FIG. 11 is a side elevational view, partly in cross section, of bobbin holders supporting the roll of the laminating film shown in FIG. 9 in position.

Figure 12:
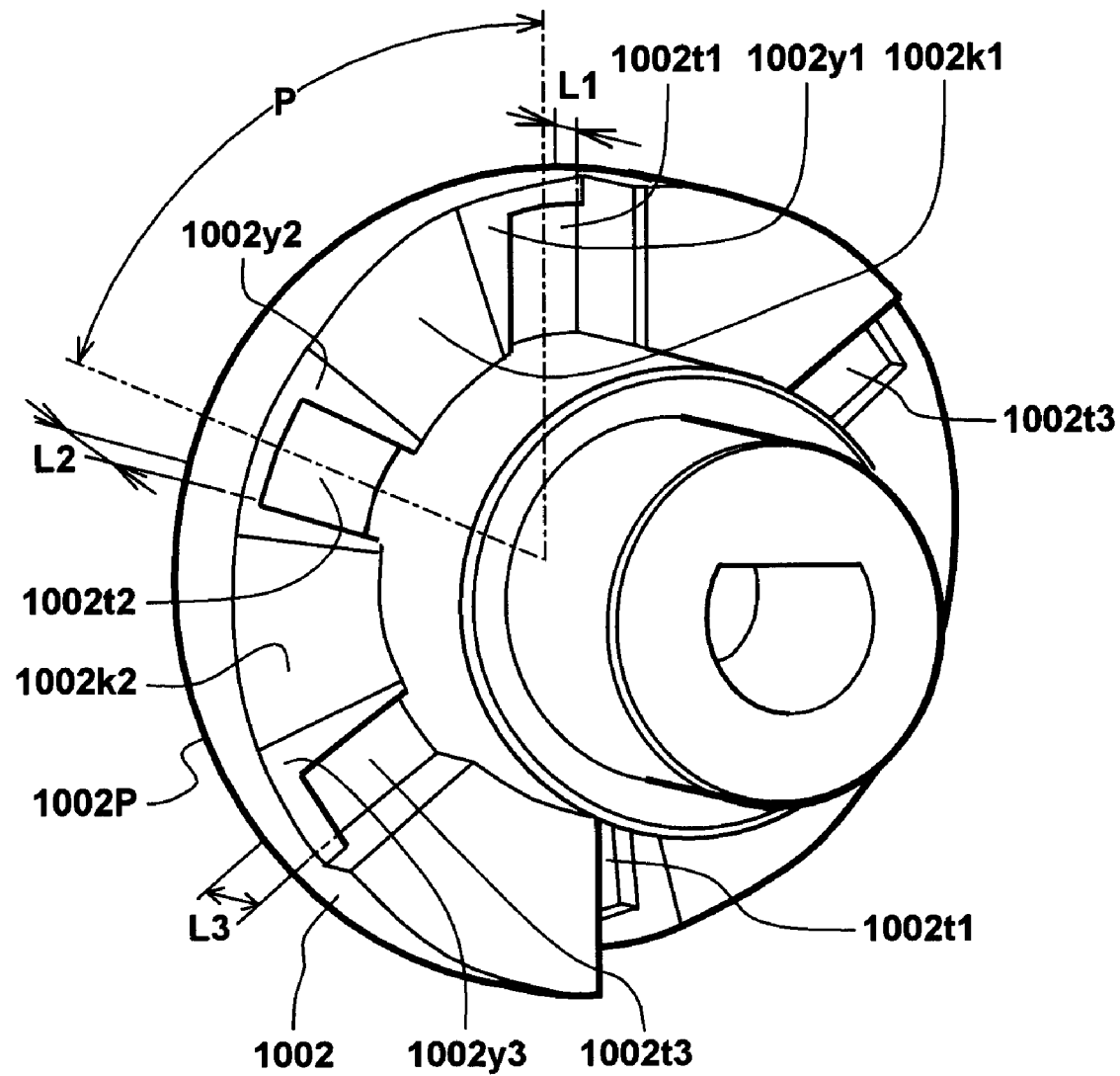
FIG. 12 is an enlarged perspective view of a fixed holder shown in FIG. 11.

FIG. 12 is an enlarged perspective view of a fixed holder shown in FIG. 11.

Figure 13:
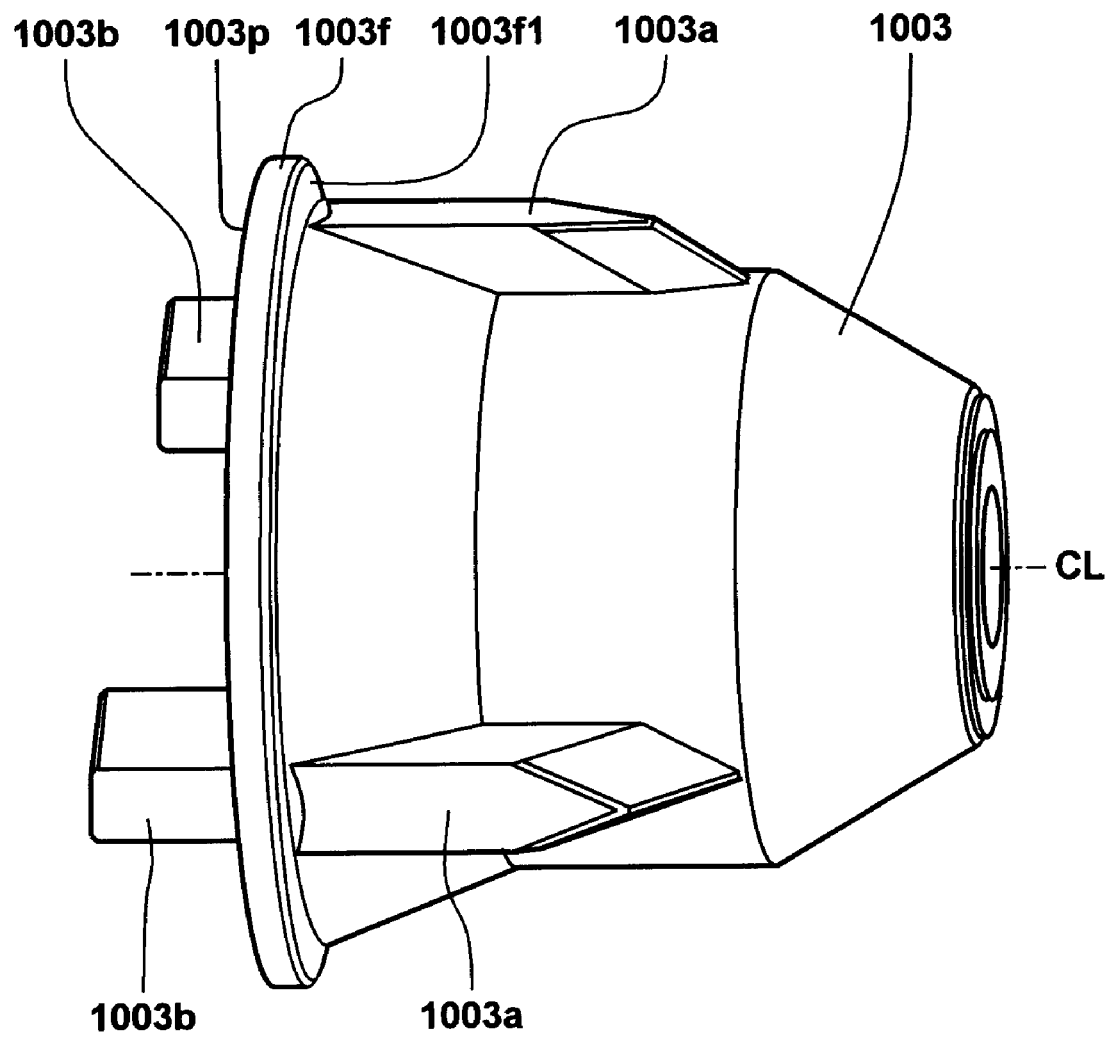
FIG. 13 is an enlarged perspective view of a movable holder shown in FIG. 11.

FIG. 13 is an enlarged perspective view of a movable holder shown in FIG. 11.

Figure 14A:
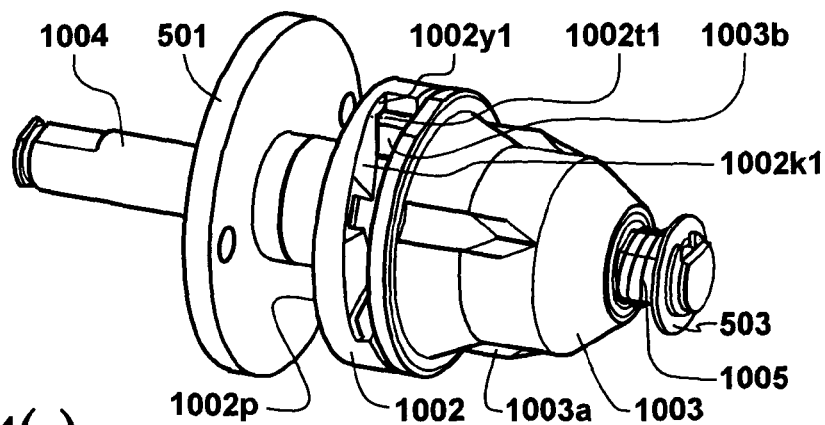
FIG. 14(a) is an enlarged perspective view of a first bobbin holder shown in FIG. 11 showing the movable holder in a first position.

FIG. 14(a) is an enlarged perspective view of a first bobbin holder shown in FIG. 11 showing the movable holder in a first position.

Figure 14B:
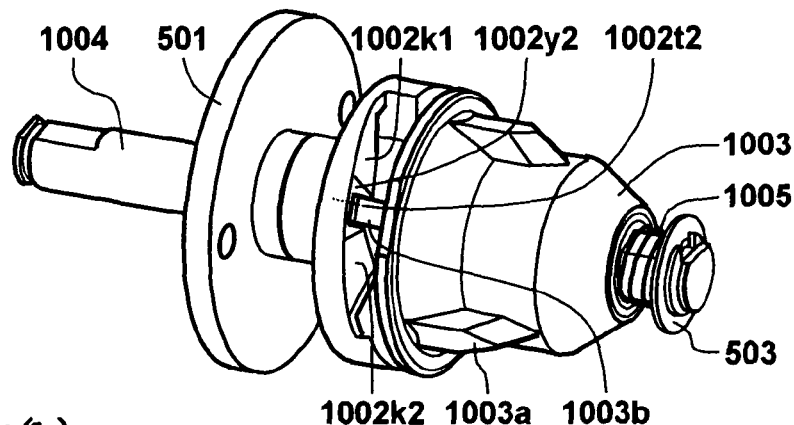
FIG. 14(b) is an enlarged perspective view of the first bobbin holder showing the movable holder in a second position.

FIG. 14(b) is an enlarged perspective view of the first bobbin holder showing the movable holder in a second position.

Figure 14C:
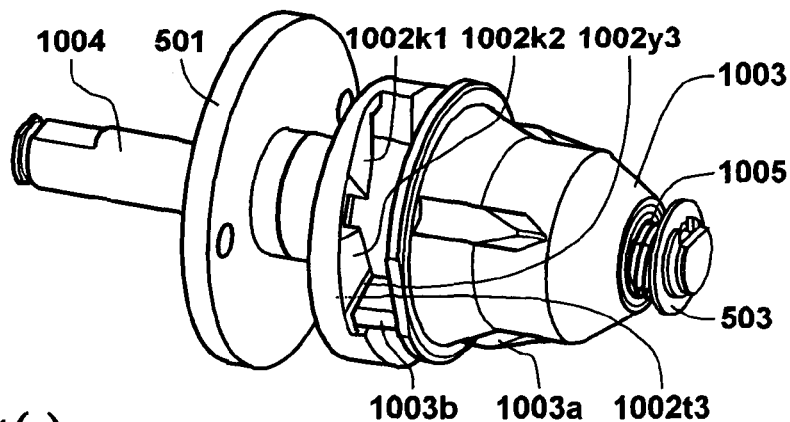
FIG. 14(c) is an enlarged perspective view of the first bobbin holder showing the movable holder in a third position.

FIG. 14(c) is an enlarged perspective view of the first bobbin holder showing the movable holder in a third position.

Figure 15A:
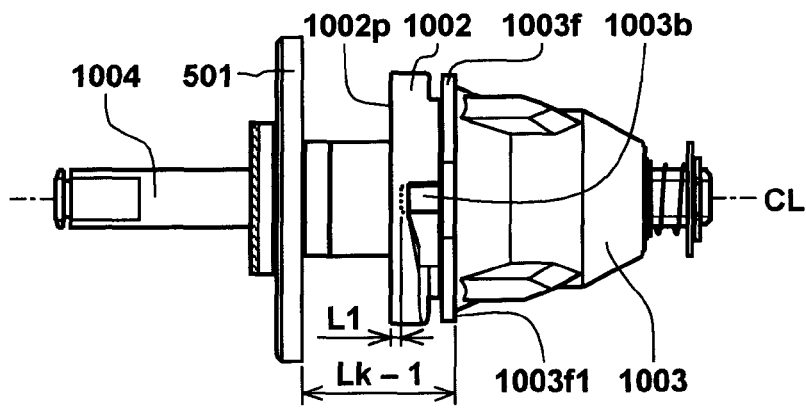
FIG. 15(a) is an enlarged top view of the first bobbin holder shown in FIG. 14(a).

FIG. 15(a) is an enlarged top view of the first bobbin holder shown in FIG. 14(a).

Figure 15B:
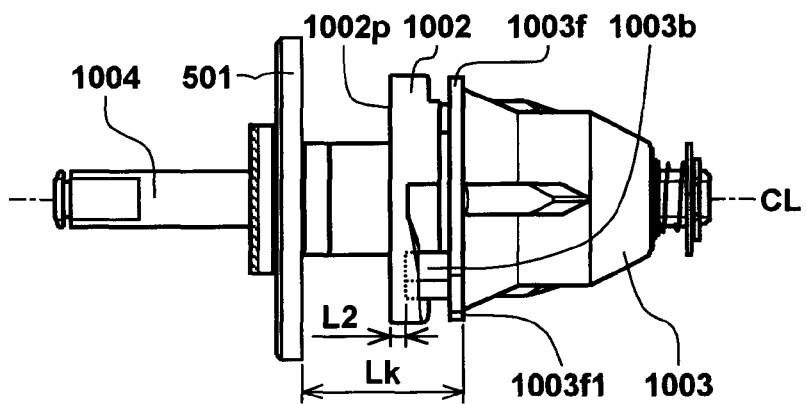
FIG. 15(b) is an enlarged top view of the first bobbin holder shown in FIG. 14(b).

FIG. 15(b) is an enlarged top view of the first bobbin holder shown in FIG. 14(b).

Figure 15C:
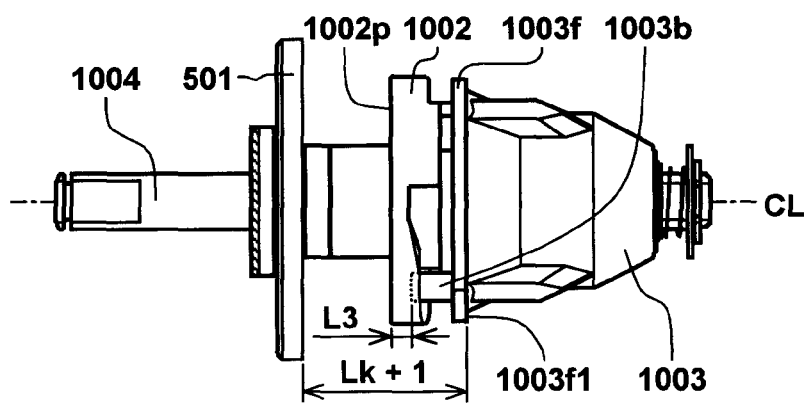
FIG. 15(c) is an enlarged top view of the first bobbin holder shown in FIG. 14(c).

FIG. 15(c) is an enlarged top view of the first bobbin holder shown in FIG. 14(c).

With referring to FIG. 1, a laminating apparatus according to a first embodiment of the present invention is described in detail.

In FIG. 1, a laminating apparatus 100 is an apparatus for laminating a protective film 2a on a top surface 1a of a card 1, which is previously recorded or printed with information, wherein the protective film 2a is affixed on a substrate 2b of a laminating film 2 in a roll shape (hereinafter generically referred to as rolled laminating film).

More specifically, the laminating apparatus 100 conducts a laminating process on the top surface 1a of the card 1. Firstly, the card 1 is inserted into a card intake slot 101. Secondly, the card 1 is conducted through a laminating process, and finally the card 1 that is laminated with the protective film 2a is carried out from a card carrying-out slot 119 in a card transport direction Td.

Further, the card 1 exemplified in the first embodiment is made from PVC (polyvinyl chloride), for example. However, it shall be understood that a material of the card 1 is not limited to PVC and any other materials such as thermo plastics and paper are applicable for the card 1.

The laminating apparatus 100 is specifically described in detail next along a transport route of the card 1 (hereinafter referred to as card transport route) from the card intake slot 101 to the card carrying-out slot 119 in the card transport direction Td.

As shown in FIG. 1, the laminating apparatus 100 is composed of the card intake slot 101, a card detecting sensor 102, a first card carrying-in roller section R1 that is constituted by a pair of a press shaft 103a and a card carrying roller 103b, a laminating position sensor 104, a second card carrying-in roller section R2 that is constituted by a pair of a press shaft 105a and a card carrying roller 105b, a thermo compression bonding section LR for laminating the protective film 2a on the top surface 1a of the card 1 (hereinafter referred to as laminating roller section LR) that is constituted by a pair of heat roller 106a and a heat press shaft 106b, a first card carrying-out roller section L1 that is constituted by a pair of a press shaft 107a and a card carrying roller 107b, a card carrying-out sensor 108, a second card carrying-out roller section L2 that is constituted by a pair of a press shaft 109a and a card carrying roller 109b, the card carrying-out slot 119, and a card guide 120 that is shown by doted lines in FIG. 1 to be detailed. Hereupon, the laminating roller section LR conducts a thermo compression bonding process (hereinafter generically referred to as laminating process).

The laminating apparatus 100 is further composed of a laminating film feeding section to be detailed and a controlling section 304 for controlling the laminating apparatus 100 totally, wherein the controlling section 304 is hereinafter referred to as CPU (Central Processing Unit) 304.

The laminating film feeding section is composed of a roll of the laminating film 2, a supply reel 110, an end mark sensor 111 for detecting a mark (to be detailed later) on the laminating film 2, a film mark sensor 112, a first guide shaft 113, a second guide shaft 114, a take-up roller 115, a heat cam 116 having a cam section 116a, a heat cam pressure position sensor 117, a heat cam stand-by position sensor 118, and a lever 121.

With referring to FIG. 7, description is given to the press shafts 107a and 109a of the first and second card carrying-out sections L1 and L2.

FIG. 7 is a top view of the first and second card carrying-out roller sections L1 and L2. A structure of the second card carrying-out roller section L2 is similar to that of the first card carrying-out roller sections L1, so that description is given to the first card carrying-out roller sections L1 as a representative of the first and second card carrying-out roller sections L1 and L2.

A width W1 of a section of the press shaft 107a having a maximal outer diameter and a width W2 of a section of the card carrying roller 107b having a maximal outer diameter are designated to be approximately equal to or larger than a width Wc of the card 1 respectively.

In this connection, since both end portions E1 of the press shaft 107a and both end portions E2 of the card carrying roller 107b never contact with the card 1, which is carried in an arrow direction in FIG. 7, respectively, a whole surface area of the card 1 that is laminated with a piece of laminating film or the protective film 2a is pressed evenly by the press shaft 107a and the card carrying roller 107b, and resulting in eliminating deviation of internal stress remaining in the card 1. In other words, the card 1 is uniformized in lower stress after the laminating process.

Accordingly, the top surface 1a of the card 1 on which the protective film 2a is laminated by the press shaft 107a and the card carrying roller 107b, is hardly scratched.

Further, the protective film 2a is prevented from wrinkling although the protective film 2a is still in higher temperature and soft.

Furthermore, evenly pressing the protective film 2a eliminates unevenness of bonding the protective film 2a to the card 1, and the protective film 2a results in hardly peeling off by itself with time.

Referring back to FIG. 1, description is given to the laminating film 2. The laminating film 2 is stretched from the supply reel 110 to the take-up reel 115 through the laminating roller section LR between the heat roller 106a and the heat press shaft 106b.

Further, the end mark sensor 111 for detecting a mark (to be detailed later) on the laminating film 2, the film mark sensor 112, the first guide shaft 113 and the second guide shaft 114 are disposed in a stretching route of the laminating film 2.

Furthermore, the heat cam 116, the heat cam pressure position sensor 117 and the heat cam stand-by position sensor 118 are also disposed in the stretching route of the laminating film 2, they will be detailed later.

More, the supply reel 110, the take-up reel 115 and the first and second guide shafts 113 and 114 are mounted on a base 1000 and constitute a cassette 1100 to be detailed. The cassette 1100 is formed so as to be able to be loaded onto or removed from the laminating apparatus 100.

Accordingly, the cassette 1100 can make a replacing process of the roll of the laminating film 2 easier. The cassette 1100 is detailed next.

With referring to FIGS. 9-11, a configuration of stretching the laminating film 2 is described next.

FIG. 9 is a perspective view of the cassette 1100 containing the roll of the laminating film 2. FIG. 10 is a perspective view of a revolution transmitting section of the laminating apparatus 100. FIG. 11 is a side elevational view, partly in cross section, of bobbin holders supporting the roll of the laminating film 2 in position.

In order to make the replacing process of the roll of the laminating film 2 easier, the laminating apparatus 100 is provided with the cassette 1100 that is composed of the base 1000, which is mounted with the supply reel 110, the first guide shaft 113, the second guide shaft 114, the take-up reel 115 and other members.

By this stretching configuration of the laminating film 2, a user can remove not the roll of the laminating film 2 but the cassette 1100 from the laminating apparatus 100, and then he can replace the roll of the laminating film 2 in a place easy to work.

Accordingly, the replacing work of the roll of the laminating film 2 can be conducted efficiently.

In FIGS. 9-11, a core bobbin 1001 is formed in an annular shape having a through hole 1001d and a plurality of ribs 1001c that are disposed on an inner surface of the through hole 1001d at an equal angular interval along an axis CL of revolution.

As shown in FIG. 11, the core bobbin 1001 is supported by a pair of first and second bobbin holders BH1 and BH2, which are inserted into each opening of the through hole 1001d respectively.

Further, the laminating film 2 is wound around the core bobbin 1001, and resulting in forming a laminating film in a roll shape (hereinafter referred to as rolled laminating film 2). The protective film 2a is affixed on a surface of the substrate 2b of the laminating film 2 at a prescribed interval in a prescribed position.

Furthermore, in FIG. 11, the protective film 2a affixed on an outermost circumferential surface is illustrated in exaggerated thickness.

The second bobbin holder BH2, which supports the rolled laminating film 2 from the base 1000 side, is composed of a shaft 110a of the supply reel 110, a holder section 601 in a frustum shape that is movably engaged with the shaft 110a and a coil spring 110b that is disposed between the holder section 601 and the base 1000.

The holder section 601 is inserted into one opening of the through hole 1001d of the core bobbin 1001, and then supports the one end portion of the core bobbin 1001.

Further, the holder section 601 is mounted on the shaft 110a so as to be slidable but not to deviate from a prescribed position of the shaft 110a.

Furthermore, the holder section 601 is braced up by resilience force of the coil spring 110b, and then slides back to the prescribed position of the shaft 110a when the holder section 601 is pressed against the base 1000.

On the other hand, as shown in FIGS. 10 and 11, the first bobbin holder BH1 is composed of a reel shaft 1004, which passes through a hole (not shown) of a chassis plate 501 that is fixed to the laminating apparatus 100, a movable section (hereinafter referred to as movable holder) 1003, which is movably engaged with the reel shaft 1004, and a fixed section (hereinafter referred to as fixed holder) 1002, which is fixed to the reel shaft 1004 and determines a position of the movable holder 1003 along the reel shaft 1004.

The movable holder 1003 is inserted into the other opening of the through hole 1001d of the core bobbin 1001, and then supports the other end portion of the core bobbin 1001.

Further, the movable holder 1003 is provided with a flange section 1003f. The flange section 1003f is provided with a contacting surface 1003f1, which faces toward the base 1000. The contacting face 1003f contacts with the other end portion of the core bobbin 1001 and regulates a position in the axial direction of the core bobbin 1001 along the axis CL of revolution.

Furthermore, the movable holder 1003 is provided with a plurality of ribs 1003a, which is formed on an outer circumferential surface of the movable holder 1003 at a prescribed angular interval and extends along the axis CL of revolution. The rib 1003a engages with the rib 1001c of the core bobbin 1001, and then the movable holder 1003 rotates in combination with the core bobbin 1001.

As shown in FIG. 11, the reel shaft 1004 is supported rotatable freely by a bearing 502a that is installed in a subplate 502, which is disposed in an opposite side to the base 1000 with respect to the chassis plate 501.

Further, revolution of the reel shaft 1004 is controlled by a friction generating device 1007 that is composed of a coil spring 1008 for generating friction.

Furthermore, the reel shaft 1004 and the fixed holder 1002 rotate integrally. Revolution of the fixed holder 1002 is transmitted to the movable holder 1003 through a revolution transmitting mechanism KD will be detailed later.

Accordingly, by the friction generating device 1007, prescribed back tension is applied to the core bobbin 1001, which is wrapped with the laminating film 2 and supported by the first and second bobbin holders BH1 and BH2, through the movable holder 1003.

Hereupon, any commonly known structure can be applied for the structure of applying back tension. There is one structure, for example, such that the reel shaft 1004 is linked to a motor and back tension is applied by load of the motor.

A washer 503 is fixed to a tip portion of the reel shaft 1004.

Further, a coil spring 1005 is disposed between the washer 503 and the movable holder 1003. By bracing-up force of the coil spring 1005, the movable holder 1003 is always pressed against the fixed holder 1002.

In reference to FIGS. 10-13, description is given to a mechanism for changing a position of the movable holder 1003 in the axis CL direction along the reel shaft 1004 next.

The mechanism for changing a position of the movable holder 1003 is the above-mentioned revolution transmitting mechanism KD. The revolution transmitting mechanism KD can change a position of the movable holder 1003 along the axis CL of revolution as well as transmitting revolution of the fixed holder 1002 to the movable holder 1003.

FIG. 12 is an enlarged perspective view of the fixed holder 1002 and FIG. 13 is an enlarged perspective view of the movable holder 1003.

As shown in FIG. 13, the movable holder 1003 is provided with one pair of positioning protrusions 1003b, which protrude at individual locations that isolate from each other in the radial direction of the movable holder 1003, on a confronting surface 1003p that confronts with the fixed holder 1002.

On the other hand, as shown in FIGS. 11 and 12, a surface 1002p of the fixed holder 1002, which is a flat surface of the fixed holder 1002 intersecting with the axis CL of revolution at the right angles and disposed in a side opposite to the confronting surface 1003p, is defined as a reference surface 1002p.

Further, as shown in FIG. 12, the fixed holder 1002 is provided with three recessed sections of which bottom surfaces are defined as a first contacting surface section 1002t1, a second contacting surface section 1002t2 and a third contacting surface section 1002t3 respectively (hereinafter the first to third contacting surface sections are generically referred to as three contacting surfaces 1002t1-1002t3). The three contacting surfaces 1002t1-1002t3 have individual distances L1, L2 and L3 from the reference surface 1002 in the axis CL direction respectively, and they are formed on the fixed holder 1002 in the circumferential direction at an equal angular interval "P".

More specifically, with defining that the distance L2 is a prescribed distance as a reference distance, a first contacting surface section 1002t1 is formed at a position having the distance L1 that is equal to "L2−1" mm from the reference surface 1002p. A second contacting surface section 1002t2 is formed at a position having the distance L2 or the reference distance L2. A third contacting surface section 1002t3 is formed at a position having the distance L3 that is equal to "L2+1" mm.

Furthermore, in the first embodiment of the present invention, the angular interval "P" between adjoining contacting surface sections is defined as 60 degrees.

Accordingly, two sets of contacting surface sections are formed when the tree contacting surfaces 1002t1-1002t3 are defined as one set of contacting surface sections.

Each of the positioning protrusions 1003b of the movable holder 1003 selectively contacts with one of the tree contacting surfaces 1002t1-1002t3, and then the movable holder 1003 is braced up in the axis CL direction by the bracing-up force of the coil spring 1005.

Further, in order to prevent each of the positioning protrusions 1003b of the movable holder 1003, which contacts with one of the tree contacting surfaces 1002t1-1002t3, from being released from the contacting surface section when the fixed holder 1002 rotates, the fixed holder 1002 is provided with a first seating surface 1002y1, a second seating surface 1002y2 and a third seating surface 1003y3 (hereinafter the first to third seating surfaces are generically referred to as three seating surfaces 1002y1-1002y3), wherein the three contacting surfaces 1002t1-1002t3 are formed as the bottom surface of the recessed section having a prescribed depth.

In other words, the three contacting surfaces 1002t1-1002t3 are formed in the three seating surfaces 1002y1-1002y3 respectively as the recessed section having the prescribed depth.

Furthermore, in order to eliminate a step between each of the three seating surfaces 1002y1-1002y3, the fixed holder 1002 is provided with a first slanted surface 1002k1 and a second slanted surface 1002k2. The first slanted surface 1002k1 links between the first seating surface 1002y1 and the second seating surface 1002y2. The second slanted surface 1002k2 links between the second seating surface 1002y2 and the third seating surface 1002y3.

According to the above-mentioned configuration of the fixed holder 1002, a user can change the contacting surface section to be contacted with the positioning protrusion 1003b. Steps for changing the contacting surface are as follows: the user holds the movable holder 1003 with fingers and moves the movable holder 1003 by withstanding bracing-up force of the coil spring 1005 in a direction that release the positioning protrusions 1003b from the recessed sections having the respective three contacting surfaces 1002t1-1002t3. Succeedingly, one of the three contacting surfaces 1002t1-1002t3 is selected so as to decide a preferable position of the movable holder 1003 in the axis CL direction. Finally, the movable holder 1003 is rotated clockwise or counterclockwise so as to fit the positioning protrusions 1003b into the selected recessed sections having preferable contacting surface section, and then the movable holder 1003 is released so as to conduct the positioning protrusions 1003b to engage with the selected recessed sections In other words, according to the selected one of the three contacting surfaces 1002t1-1002t3, a position in the axis CL direction of the movable holder 1003 can be changed in proportion to the distances L1-L3 from the reference surface 1002p.

Accordingly, the revolution transmitting mechanism KD is capable of changing a position of the movable holder 1003 in the axis CL direction along the reel shaft 1004 as well as transmitting revolution of the fixed holder 1002 to the movable holder 1003 and finally to the core bobbin 1001 by means of the pair of positioning protrusions 1003b of the movable holder 1003, which engage with one of the three recessed sections having the respective three contacting surfaces 1002t1-1002t3 provided on the fixed holder 1002.

In reference to FIGS. 14(a)-14(c), changing the position in the axis CL direction of the movable holder 1003 is described in detail next.

FIG. 14(a) shows a first position of the movable holder 1003, wherein the positioning protrusion 1003b contacts with the first contacting surface section 1002t1. FIG. 14(b) shows a second position of the movable holder 1003, wherein the positioning protrusion 1003b contacts with the second contacting surface section 1002t2. FIG. 14(c) shows a third position of the movable holder 1003, wherein the positioning protrusion 1003b contacts with the third contacting surface section 1002t3. Hereupon, FIGS. 14(a)-14(c) are diagrammatic illustrations, so that some members are omitted in comparison with FIG. 11.

As mentioned above, a position in the axis CL direction of the movable holder 1003 can be changed in three positions of ±1 mm with respect to the reference surface 1002p in case the second position is defined as a reference position.

In reference to FIGS. 15(a)-15(c), changing the position in the axis CL direction of the movable holder 1003 is described furthermore.

FIGS. 15(a)-15(c) are enlarged top views of the first bobbin holder BH1 shown in FIGS. 14(a)-14(c) respectively.

Further, FIG. 15(b) is the top view of the first bobbin holder BH1 showing the second position of the movable holder 1003 as the reference position. In FIG. 15(b), a distance between a surface of the chassis plate 501, which confronts with the reference surface 1002p, and the contacting surface section 1003f1 of the flange section 1003f of the movable holder 1003 is defined as LK mm as a reference distance.

Accordingly, in this definition, a distance of the first position of the movable holder 1003 shown in FIG. 15(a) is "LK−1" mm, and a distance of the third position of the movable holder 1003 shown in FIG. 15(c) is "LK+1" mm.

As mentioned above, the position in the axis CL direction of the movable holder 1003 is determined by the distance from the reference surface 1002p of the fixed holder 1002 to one of the three contacting surfaces 1002t1-1002t3.

In the first embodiment of the present invention, it is designated such that the position in the axis CL direction of the movable holder 1003 is three steps of ±1 mm with respect to the reference position and a number of contacting surface sections of the fixed holder 1002 is three. However, it shall be understood that a contacting surface section can be provided in arbitrary steps and quantities with defining an arbitrary distance as a reference distance.

In addition thereto, positioning the movable holder 1003 is made easier in case the movable holder 1003 is rotated so as to make the positioning protrusion 1003b slide on the first slanted surface 1002k1 or the second slanted surface 1002k2.

As detailed above, according to the first embodiment of the present invention, the mechanism for enabling to position the movable holder 1003 in the axis CL direction at plural positions is realized by selectively contacting the positioning protrusions 1003b with any of the tree contacting surfaces 1002t1-1002t3. In this regard, positional fluctuation of the protective film 2a in a lateral direction intersecting at right angles to the longitudinal direction of the rolled laminating film 2 can be adjusted in higher accuracy and stability without any fluctuation.

Accordingly, a laminating position of the protective film 2a with respect to the card 1 is hardly fluctuated, and resulting in obtaining a laminated card in higher quality.

Further, a process for adjusting fluctuation of laminating position does not depend upon visual estimation or experience, so that the process is extremely simple and easy.

Furthermore, it shall be understood that the above-mentioned first bobbin holder BH1 provided with the fixed holder 1002 and the movable holder 1003 can be applied for the take-up reel 115 as well as the supply reel 110.

In case the first bobbin holder BH1 is applied for the supply reel 110, a position of the protective film 2a in the lateral direction intersecting at right angles to the longitudinal direction of the rolled laminating film 2 is adjusted, and then the adjusted laminating film 2 is supplied to the laminating roller section LR.

On the contrary, in case a position of a side edge of the laminating film 2 is desirably taken up at a prescribed position of the take-up roller 115 in higher accuracy, the first bobbin holder BH1 shall be applied for the take-up reel 115 so as to be able to adjust a position in the axis CL direction of the take-up reel 115.

With referring to FIGS. 1 and 2, a driving system of the laminating apparatus 100 is described in detail next.

Allocation of each component shown in FIG. 2 corresponds to that shown in FIG. 1. In FIG. 2, the components such as the card carrying rollers 103b, 105b, 107b and 109b, the heat cam 116 and the take-up reel 115 are common to those shown in FIG. 1.

The laminating apparatus 100 is provided with a card carrying motor 201, a heat cam motor 206 and a take-up motor 209 for taking up the laminating film 2 as driving sources.

Motive power of the card carrying motor 201 is transmitted through first to third power transmission routes.

More specifically, with respect to a first power transmission route, the motive power of the card carrying motor 201 is transmitted to an idle gear 203 by way of a motor pulley 201a and a first belt 202, and further transmitted to the card carrying roller 105b of the second card carrying-in roller section R2, by means of a first intermediate gear 203b1, which engages with the idle gear 203.

With respect to a second power transmission route, the motive power of the card carrying motor 201 is also transmitted to the card carrying roller 103b of the first card carrying-in roller section R1 by way of a second belt 204, which is wound around the card carrying roller 105b.

With respect to a third power transmission route, the motive power of the card carrying motor 201 is transmitted to the card carrying roller 107b of the first card carrying-out roller section L1 by means of a second intermediate gear 203b2, which engages with the idle gear 203, and further transmitted to the card carrying roller 109b of the second card carrying-out roller section L2 by way of a third belt 205, which is wound around the card carrying roller 107b.

On the other hand, motive power of the heat cam motor 206 is transmitted to the heat cam 116 by way of a worm wheel 207 and an idle gear 208, which engages with the worm wheel 207.

As shown in FIGS. 1 and 2, the heat cam 116 is provided with the cam section 116a in a prescribed shape.

The lever 121 shown in FIG. 1 contacts with the cam section 116a while the lever 121 pushes the cam section 116a upward. In this connection, when the heat cam 116 rotates, the lever 121 reciprocally moves in the vertical direction with sliding along the outer circumferential surface of the cam section 116a. Since the lever 121 is linked to the heat roller 106a, the heat roller 106a moves vertically in proportion to rotation of the heat cam 116 as a result.

Further, a rotational position of the heat cam 116 is detected by the heat cam pressure position sensor 117 and the heat cam stand-by position sensor 118.

More specifically, the heat cam 116 rotates clockwise in FIG. 1 and moves the heat roller 106a downward toward the heat press shaft 106b, and then the heat cam pressure position sensor 117 detects a moment when the heat roller 106a begins to be pressed against the heat press shaft 106b.

On the contrary, the heat cam stand-by position sensor 118 detects a moment when the heat roller 106a begins to be separated from the heat press shaft 106b.

In addition thereto, as shown in FIG. 2, motive power of the take-up motor 209 is transmitted to the take-up reel 115 by way of a worm wheel 210 and an idle gear 211, which engages with the worm wheel 210.

With referring to FIG. 3, an electrical configuration of the laminating apparatus 100 is described next. The laminating apparatus 100 is provided with the CPU 304 as a controlling device. As shown in FIG. 3, respective sensor output information from the card detecting sensor 102, the laminating position sensor 104, the card carrying-out sensor 108, the end mark sensor 111, the film mark sensor 112, the heat cam pressure position sensor 117 and the heat cam stand-by position sensor 118 are inputted into the CPU 304.

Further, the CPU 304 is connected to servo circuits 301, 302 and 303, which are hooked up to the card carrying motor 201, the heat cam motor 206 and the film take-up motor 209 respectively.

By this electrical configuration, the CPU 304 enables to control each of the motors 201, 206 and 209 through each of the servo circuits 301, 302 and 303 respectively in response to each sensor output information to be inputted into the CPU 304.

In reference to FIGS. 1, 4(a) and 4(b), the card guide 120 is described in detail next.

FIG. 4(a) is a perspective view of the card guide 120. FIG. 4(b) is an end view of the card guide 120 viewed from the card carrying roller 105b side opposite to the card transport direction Td shown in FIG. 4(a), wherein the card 1 is guided in position.

The card guide 120 is disposed between the first and second card carrying-in roller sections R1 and R2 and supports a bottom surface 1b of the card 1 while the card 1 is transported between the first and second card carrying-in roller sections R1 and R2, and then the card guide 120 guides the card 1 along the card transport route.

In other words, the card guide 120 is used for supporting the card 1 along the card transport route while the card 1 is transported from the card intake slot 101 to the laminating roller section LR.

More specifically, as shown in FIGS. 4(a) and 4(b), the card guide 120 is composed of a body section 125 and bump sections 121a and 121b. The body section 125 is constituted by a base section 125a and a pair of side sections 125b, which are provided vertically at both sides of the body section 125a, and formed in an H-letter shape. The bump sections 121a and 121b are formed with slanted surfaces 121ak and 121bk respectively, which are provided at a part of inside corners of the base section 125a intersecting at right angles to the side sections 125b, so as to fill in the inside corners. The slanted surfaces 121ak and 121bk are slanted in a direction perpendicular to the card transport direction Td.

Further, the bump sections 121a and 121b are provided with guiding inclined planes 121a1 and 121b1 respectively, which are slanted in the card transport direction Td so as to guide the card 1, when a front end portion of the card 1 contacts with the bump sections 121a and 121b.

Hereinafter, in some cases, the bump sections 121a and 121b are generically referred to as bump section 121, and the pair of slanted surfaces 121ak and 121bk are generically referred to as slanted surface 121k.

The body section 125 is provided with an opening section 125e in the middle of the base section 125a approximately. The first carrying-in roller section R1 is contained in the opening section 125e. However, only the card carrying roller 103b is illustrated in FIGS. 4(a) and 4(b).

Further, the second carrying-in roller section R2 is disposed at one end portion of the body section 125a in the card transport direction Td. However, only the card carrying roller 105b is illustrated in FIGS. 4(a) and 4(b).

In the above-mentioned structure of the card guide 120, when the card 1 is carried in the card guide 120 in an arrow direction along the card transport direction Td as shown in FIG. 4(a), two ridgelines 1d of the card 1, which are formed by both sides 1c and the bottom surface 1b of the card 1, contact with the slanted surfaces 121ak and 121bk, and then the card 1 is supported at a guide level Tb as shown in FIG. 4(b). The guide level Tb is higher than a level of a transporting surface Ts by a distance of Ht1. In other words, the guide level Tb is designated to be allocated in a position to be closer to the guide shaft 113.

A laminating operation of the laminating apparatus 100 according to the first embodiment of the present invention is described in detail next.

In the laminating apparatus 100, when laminating a protective film 2a on a card 1, the CPU 304 controls an advancing speed or a laminating speed of the card 1 and the laminating film 2 in multiple stages of speed so as to optimize lamination quality in accordance with variations of the card 1 or the laminating film 2 in material and thickness.

More specifically, in the laminating apparatus 100, the laminating speed can be adjusted within a range from 4.0 mm/s to 9.0 mm/s by an interval of 0.5 mm/s.

In following operational descriptions, it is defined that the laminating speed is controlled to be 4.0 mm/s constant.

Hereupon, the laminating film 2 is described briefly. There are two types of laminating films. The one is a so-called "patch film" type laminating film that is constituted by a piece of laminate film or protective film 2a having a dimension approximately equivalent to that of the card 1, which is successively bonded on a base film or substrate. The other is a so-called "overlay film" type laminating film that is constituted by a thermo-adhesive resin, which enables to be thermally bonded on a surface of the card 1 and is coated on a base tape or substrate in ribbon shape.

In the case of such an "overlay film" type laminating film, the laminating film is previously cut halfway along a borderline of an area to be bonded, that is, contour of a card, so that the thermo-adhesive resin can be easily separated from the substrate after laminated on a surface of a card.

In reference to FIGS. 1, 5(a)-6, the laminating operation of the laminating apparatus 100 is detailed next. In the following operational descriptions, a patch film type laminating film is used as the laminating film 2.

As shown in FIG. 6, the laminating operation is divided into six phases of first to sixth periods in time series for the sake of easier understanding.

Prior to detailing each period, terms common to each period are described first. In FIG. 6, three digit numbers exhibited at the far left of the chart such as 201, 209, 206, 102, 104, 108, 112, 111, 117 and 118 denote the card carrying motor 201, the film take-up motor 209, the heat cam motor 206, the card detecting sensor 102, the laminate position sensor 104, the card carrying-out sensor 108, the film mark sensor 112, the end mark sensor 111, the heat cam pressure position sensor 117 and the heat cam stand-by position sensor 118 respectively.

Further, in FIG. 6, terms "Fwd" and "Lo" denote "forward" and "low" respectively. In case of the card carrying motor 201, for example, the motor 201 rotates in a "Fwd" direction during fist and second periods so as to carry a card 1 in a forward direction toward the card carrying-out slot 119, and then the motor 201 is turned "Off" during a third period.

Furthermore, in case of the heat cam motor 206, the heat cam motor 206 rotates so as to move the heat press shaft 106b in a "down" direction or "downward" during the third period and is turned "Off" during a fourth period, and then rotates so as to move the heat press shaft 106b in an "up" direction or "upward" during a fifth period.

More, in case of the card detecting sensor 102, the card detecting sensor 102 transmits a "Lo" level signal to the CPU 304 in the first period. In other words, a level of a signal transmitted from the sensor 102 changes from "High" to "Lo" when the first period begins.

1. First Period: Card Carrying-In Operation

In FIG. 1, when a card 1 is inserted into the laminating apparatus 100 through the card intake slot 101 by means of manpower or a not shown carrying-in device, the card detecting sensor 102 detects that the card 1 is inserted.

As shown in FIG. 6, the card detecting sensor 102 outputs a detection signal "Lo" to the CPU 304 when the card detecting sensor 102 detects that the card 1 is inserted the laminating apparatus 100. The CPU 304 directs the servo circuit 301 in response to the detection signal "Lo" to rotate the card carrying motor 201 in a "Fwd" direction so as to carry the card 1 in the forward direction toward the card carrying-out slot 119 along the card transport direction Td.

Accordingly, the card 1 is transported toward the laminating roller section LR while the card 1 is caught between the press shaft 103a and the card carrying roller 103b of the first card carrying-in roller section R1, and succeedingly between the press shaft 105a and the card carrying roller 105b of the second card carrying-in roller section R2 through the card guide 120.

In this connection, the both ridgelines 1d on the bottom of the card 1 is supported by the card guide 120 as shown in FIG. 4(b) while the card 1 is transported from the first card carrying-in roller section R1 to the second card carrying-in roller section R2.

With referring to FIGS. 5(a)-6, the card carrying-in operation is detailed furthermore.

FIG. 5(a) shows a moment when a front end portion 1t of the card 1 reaches a section "D" in the neighborhood of the first guide shaft 113 after passed through the second carrying-in roller section R2. FIG. 5(b) shows another moment when the front end portion of the card 1 reaches a section "E" in the neighborhood of the second guide shaft 114.

As mentioned above, the guide level Tb that is designated by the bump section 121 of the card guide 120 is allocated at the position higher than the level of the transporting surface Ts, that is, at the position closer to the laminating film 2.

Accordingly, the card 1 is supported at the higher position than the transporting surface Ts when the card 1 reaches the second carrying-in roller section R2. In this regard, a diameter of the press shaft 105a is designed so as to conduct the front end portion 1t of the card 1 automatically to the second carrying-in roller section R2 between the press shaft 105a and the card carrying roller 105b.

A tail end portion 1s of the card 1 is released from the first carrying-in roller section R1 at the same time when the front end portion 1t of the card 1 is caught in the second carrying-in roller section R2. Then, as shown in FIG. 5(a), the tail end portion 1s is raised upward in an arrow D1 direction by the bump section 121 immediately after the tail end portion 1s is released from the first carrying-in roller section R1.

In other words, the card 1 is slanted such that the tail end portion 1s of the card 1 approaches the laminating film 2.

In this state of the card 1, the front end portion 1t of the card 1 is carried out from the second carrying-in roller section R2 while the front end portion 1t maintains a position extremely lower than the guide level Td but approximately the same level as the transporting surface Ts in comparison with a case excluding the card guide 120. In this connection, the card 1 is conducted under the first guide shaft 113 without any problem although the first guide shaft 113 is disposed in a position close to the transporting surface Ts.

Accordingly, the first guide shaft 113 can be disposed in a position closer to the transporting surface Ts even though the top surface 1a of the card 1 to be laminated with the protective film 2a is concaved.

In order to obtain an excellent bonding characteristic of the protective film 2a, it is preferable that the laminating film 2 shall be in parallel with the transporting surface Ts as much as possible. In this regard, the second guide shaft 114 is also disposed in a position close to the transporting surface Ts in accordance with the first guide shaft 113.

As mentioned above, the bump section 121 guides the card 1 so as to lift the card 1 while not the bottom surface 1b but both the ridgelines 1d of the card 1 contact with slanted surface 121k of the bump section 121.

Even in case the card 1 is applied with abnormal load that crushes the card caused by disturbance, the card 1 can easily bend and results in absorbing the load.

Accordingly, the transporting operation of the card 1 is continued without any interruption or problem, and is extremely high in reliability.

Further, scratches on both the top and bottom surfaces 1a and 1b of the card 1 never occur, so that the card 1 is never degraded in quality.

In the card carrying-in operation during the first period, the card detecting sensor 102 transmits a card detection signal in a "High" level to the CPU 304 when the card detecting sensor 102 can not detect the card 1 any more in accordance with movement of the card 1. The CPU 304 directs the card carrying motor 201 through the servo circuit 301 to carry the card 1 as far as a prescribed carrying distance, and then to stop rotating.

As shown in FIG. 6, the direction of the CPU 304 to stop the card carrying motor 201 is actually the end of the second period.

Further, it is acceptable that the direction of stopping the card carrying motor 201 is transmitted in response to an output from the laminating position sensor 104.

Furthermore, a card carrying speed during the first period does not affect the laminating process, so that the card carrying speed can be designated in higher speed as high as the speed is detrimental to transport the card 1.

2. Second Period: Laminating Position Setting Operation

The card carrying motor 201 is rotating in the "Fwd" direction through the second period continuously from the first period, so that the card 1 is carried in the forward direction toward the card carrying-out slot 119. The CPU 304 directs the card carrying motor 201 to stop when the card 1 passes through the laminating position sensor 104 and the laminating position sensor 104 does not output a card detection signal "Lo", that is, when the card detection signal "Lo" changes into a "High" level signal. A moment when the card detection signal of the laminating position sensor 104 changes from "Lo" to "High" is the end of the second period.

Figure 16:
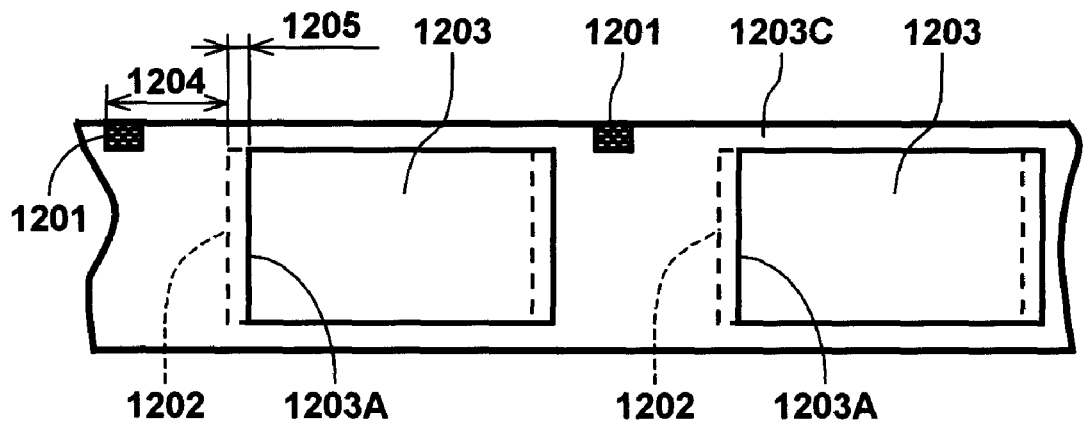
FIG. 16 is a pattern diagram of a rolled laminating film showing positional fluctuation of a patch in a direction of the rolled laminating film to be taken up or in a longitudinal direction of the rolled laminating film.
Figure 17:
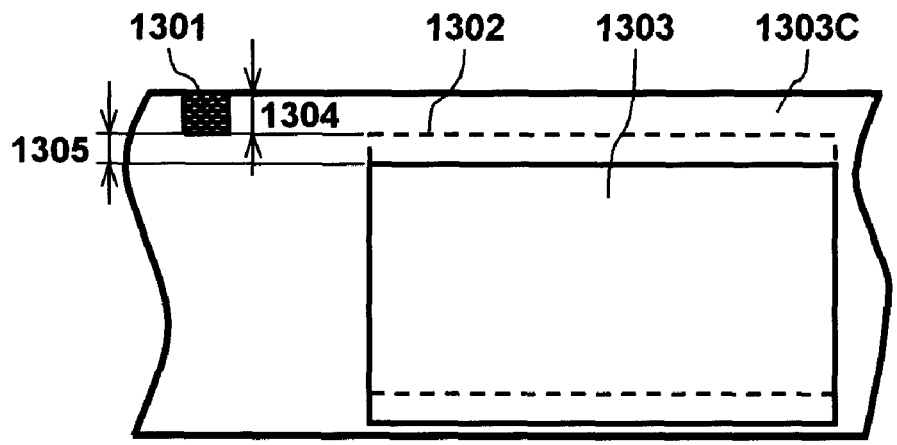
FIG. 17 is a pattern diagram of a rolled laminating film showing positional fluctuation of a patch in a direction intersecting at right angles to a longitudinal direction of the rolled laminating film to be taken up or in a lateral direction of the rolled laminating film.

In case the laminating film 2 is constituted by a plurality of patches (protective films) 1203 as shown in FIG. 16, hereupon, by detecting a sensor mark 1201, which indicates the location of the patch 1203 on the laminating film 2 (1203C) with respect to a shifting amount 1205 of positional fluctuation of the patch 1203 in the longitudinal direction of the rolled laminating film 2 (1203C), the card 1 is stopped to move after the card 1 is advanced by a prescribed distance equivalent to a prescribed offset amount.

Accordingly, the shifting amount 1205 of the patch 1203 with respect to the sensor mark 1201 is compensated by a stopping position of the card 1 at where the card 1 is laminated with the protective film 2a.

As a result, the laminating film 2 is positioned in place.

3. Third Period: Heat Roller Pressing Operation

Successively, the CPU 304 directs the servo circuit 302 to drive the heat cam motor 206 to rotate in a "Down" direction so as to rotate the heat cam 116 when the card detection signal "Lo" changes into a "High" level signal. The heat cam 116 moves the heat roller 106a downward toward the heat press shaft 106b.

When an output signal "High" outputted from the heat cam pressure position sensor 117 is transmitted to the CPU 304, the CPU 304 directs the servo circuit 302 to stop the heat cam motor 206 rotating in response to the output signal "High". The heat cam motor 206 is stopped rotating when it is confirmed that the heat roller 106a reaches to a position at where the heat roller 106a is pressed against the heat press shaft 106b.

4. Fourth Period: Laminating Operation

The CPU 304 activates the card carrying motor 201 through the servo circuit 301 so as to carry the card 1 in the forward direction or in the card carrying-out direction at the laminating speed. A distance of the card 1 to be carried in the forward direction at the laminating speed is at least a maximum length along the card 1 in the carrying direction of the card 1 within an area for laminating the protective film 2a on the top surface 1a of the card 1.

Further, at the same time, the CPU 304 directs the servo circuit 303 to rotate the take-up motor 209 so as to take up the laminating film 2 in a take-up direction or in an arrow "B" direction shown in FIGS. 1 and 5(b) in synchronism with the laminating speed.

5. Fifth Period: Operations of Separating Heat Roller and Peeling Off Laminating Film The CPU 304 activates the heat cam motor 206 to rotate through the servo circuit 302 so as to move the heat roller 106a upward, and then the CPU 304 stops the heat cam motor 206 rotating when a detection signal "High" of the cam section 116a outputted from the heat cam stand-by position sensor 118 is inputted into the CPU 304.

On the other hand, the CPU 304 activates the card carrying motor 201 to carry the card 1 in the forward direction as far as a prescribed distance, and then stops the card 1 moving.

When the front end portion 1t of the card 1 reaches to the guide shaft 114 while the card 1 and the laminating film 2 are integrally carried in the forward direction toward the card carrying-out slot 119, the substrate 2b of the laminating film 2 is pulled obliquely upward in the arrow "B" direction in FIG. 1 so as to be separated from the card 1 within the downstream side of the second guide roller 114.

Accordingly, the substrate 2b of the laminating film 2, which is a residual part of the laminating film 2 after the protective film 2a is bonded on the top surface 1a of the card 1, is taken up by the take-up reel 115.

The state of the operation of peeling off the laminating film 2 is exemplified in FIG. 5(b). A distance Ht2 between the transporting surface Ts and the first and second guide shafts 113 and 114 shown in FIG. 5(a) is designated to be relatively small, so that a distance between the front end portion 1t of the card 1 and the transporting surface Ts caused by being pulled up by the laminating film 2 is also small.

In this connection, as shown in FIG. 5(b), a peeling-off angle C2 between a tangent, which touches a point of the card 1 at where the substrate 2b of the laminating film 2 is peeled off from the card 1, and the surface of the substrate 2b of the laminating film 2 to be taken up by the take-up reel becomes large enough.

Accordingly, peeling off or separating the substrate 2b of the laminating film 2 from the top surface 1a of the card 1 is made easier, and any residual of the laminating film 2 including the substrate 2b never remains on the card 1.

Further, as mentioned above, the distance of the front end portion 1t of the card 1 from the transporting surface Ts caused by being pulled up by the laminating film 2 is small. Therefore, a diameter of the press shaft 107a, which is a smallest limit diameter for being able to conduct the card 1 to the first card carrying-out roller section L1 between the press shaft 107a and the card carrying rollers 107b smoothly without hitting against the press shaft 107a, can be made extremely smaller than that of the conventional press shaft.

In this regard, the press shaft 107a is disposed adjacent to the second guide shaft 114 extremely.

By the above-mentioned configuration, the laminating apparatus 100 according to the first embodiment of the present invention is drastically miniaturized.

The substrate 2b of the laminating film 2 is provided with a sensor mark or a film mark (not shown) that corresponds to a prescribed bonding pitch of the protective film 2a affixed on the substrate 2b. When the end mark sensor 111 detects the film mark, the end mark sensor 111 transmits a "Lo" level signal to the CPU 304, and then the CPU 304 directs the servo circuit 303 to stop the take-up motor 209 rotating.

On the contrary, in case the laminating film 2 is an overlay type laminating film, rotation of the take-up motor 209 is interrupted in synchronism with stopping the card carrying motor 201 rotating.

6. Sixth Period: Card Carrying-Out Operation

The CPU 304 directs the servo circuit 301 to drive the card carrying motor 201 to rotate in the "Fwd" direction, and activates the card carrying rollers 107b and 109b so as to carry the card 1 in the forward direction toward the card carrying-out slot 119. Then the CPU 304 directs the servo circuit 301 to stop the card carrying motor 201 rotating subsequently to a moment when the card carrying-out sensor 108 disables to detect the card 1 any more. Consequently, the card 1 laminated with the protective film 2a, that is, the laminated card 1 is carried out externally from the card carrying-out slot 119 of the laminating apparatus 100.

Accordingly, as detailed above, the card 1 is laminated with the protective film 2a by applying the operations detailed in the first to sixth periods mentioned above.

Second Embodiment

With referring to FIG. 8, a card printing machine, which is equipped with both a printing function for printing information on a card and a laminating function for conducting a laminating process on a surface of the card that is printed by means of the printing function, is described in detail next.

Figure 8:
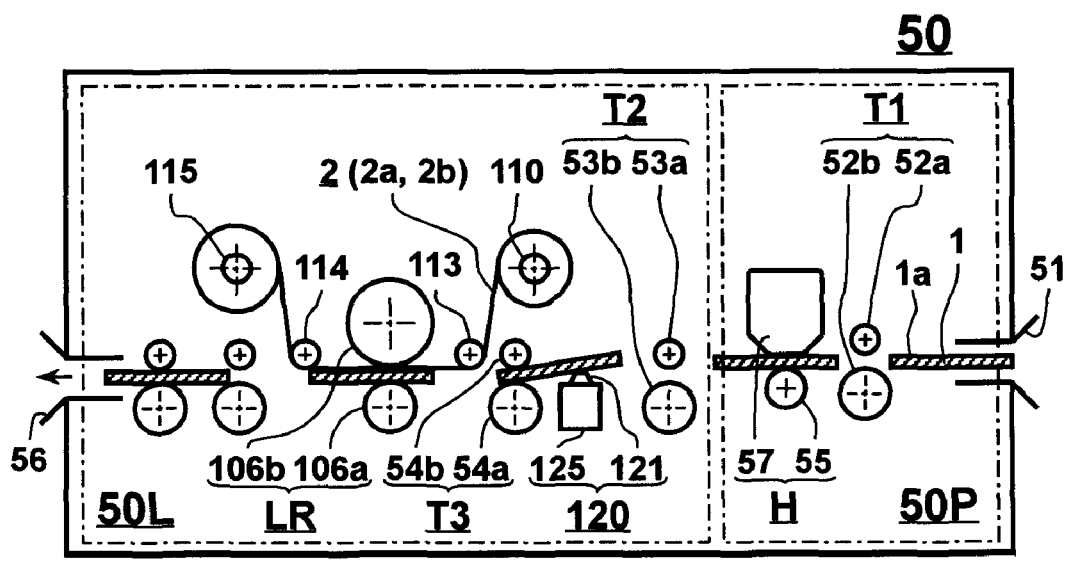
FIG. 8 is a plan view showing a frame format of a card printing machine equipped with a laminating apparatus according to a second embodiment of the present invention.

FIG. 8 is a plan view showing a frame format of a card printing machine equipped with a laminating apparatus according to a second embodiment of the present invention.

As shown in FIG. 8, a card printing machine 50 is composed of a printing apparatus 50P and a laminating apparatus 50L. A fundamental configuration of the laminating apparatus 50L is similar to that of the laminating apparatus 100 according to the first embodiment of the present invention shown in FIG. 1. In this regard, the same components as those of the laminating apparatus 100 are denoted by the same reference signs and their details are omitted.

In FIG. 8, a card 1, which is inserted into the card printing machine 50 through a card intake slot 51 by means of manpower or a not shown inserting device, is carried to an internal printing head section "H" by means of a first card carrying-in roller section T1 that is constituted by a pair of rollers 52a and 52b.

The printing head section "H" is composed of a thermal head 57, which is mounted with printing ink, and a platen roller 55, which pushes a top surface 1a for printing of the card 1 upward against the thermal head 57.

The thermal head 57 prints a prescribed letter or image on the top surface 1a of the card 1 by heating the mounted printing ink in response to instructions from a not shown printing control section.

After the card 1 is printed, the printed card 1 is carried into the laminating apparatus 50L, which is allocated adjacent to the printing apparatus 50P, by means of a second card carrying-in roller section T2 that is constituted by a pair of rollers 53a and 53b.

In the laminating apparatus 50L, the printed card 1, which is carried therein from the printing apparatus 50P, is carried to a thermo compression bonding section LR for laminating a protective film 2a of a laminating film 2 on the top surface 1a of the card 1 (hereinafter referred to as laminating roller section LR) by means of a third card carrying-in roller section T3 that is constituted by a pair of rollers 54*a* and 54*b*.

Further, a card guide 120 is disposed between the second and third card carrying-in roller sections T2 and T3. Configurations and operations of the card guide 120, the laminating roller section LR and other sections and components, which are allocated in a downstream side of the laminating roller section LR, are similar to those of the laminating apparatus 100 according to the first embodiment of the present invention. Therefore, detailed descriptions of these members are omitted.

The card 1 of which the top surface 1*a* is conducted through the laminating process, is finally carried out from the card printing machine 50 through a card carrying-out slot 56.

As mentioned above, the laminating apparatus 100 and the laminating apparatus 50L of the card printing machine 50 are provided with the card guide 120, which is disposed in the card transport route of the card 1 just before the laminating roller section LR and guides the card 1 with supporting the card 1 in the higher position than the transporting surface Ts. As shown in FIG. 5(*a*), the card guide 120 raises the tail end portion 1*s* side of the card 1 at a moment when the transported card 1 is carried in the laminating roller section LR. In this connection, the card 1 is inclined with respect to the card transport direction so as to approach the laminating film 2, and then the card 1 is carried in the laminating roller section LR while the card 1 maintains its inclination.

Accordingly, defective transportation of the card 1 never occurs even if the card 1 is in high temperature due to heat applied during the printing process and the top surface 1*a* of the card 1 is concaved before the laminating process.

Further, it is easy to separate unnecessary laminating members such as the substrate 2*b* after the laminating process is completed, and resulting in conducting excellent separating process.

Furthermore, it is possible for the card 1 to be laminated with the protective film 2*a*, even though the card 1 is made from a cheaper material having less heat resistance. In this regard, the laminating apparatus 100 and the laminating apparatus 50L of the printing machine 50 is excellent in versatility extremely.

More, the laminating apparatus 100 and the laminating apparatus 50L according to the present invention can excellently conduct not only the laminating process while the card 1 is carried along the same transporting surface Ts without slanting the card transporting route itself at a point immediately before or after the laminating roller section LR at the least but also the separating process for peeling residual of a laminating member off from a warped card 1.

Accordingly, the laminating apparatus 100 and the laminating apparatus 50L according to the present invention are simpler in structure and constituted by less component parts in comparison with other laminating apparatuses of which card transporting rout is made to slant, and result in being able to manufacture a laminated card easily and in lower cost.

Moreover, as mentioned above, the laminating apparatus 100 and the laminating apparatus 50L according to the present invention is provided with the first bobbin holder BH1 that is used for mounting the core bobbin 1001, which is wrapped in the laminating film 2, on the supply reel 110. The first bobbin holder BH1 is furnished with the fixed holder 1002 fixed to the reel shaft 1004 and the movable holder 1003, which is movable along the reel shaft 1004 and braced up toward the fixed holder 1002.

In addition thereto, the movable holder 1003 is provided with the positioning protrusions 1003*b*, which are constructed so as to be able to selectively contact with one of the three contacting surfaces 1002*t*1-1002*t*3 that are formed in the different positions of the fixed holder 1002 in the axial direction, and resulting in constructing the revolution transmitting mechanism KD. In this regard, positional fluctuation of the protective film 2*a* of the laminating film 2 in the lateral direction intersecting at right angles to the longitudinal direction of a roll of the laminating film 2 can be adjusted in higher accuracy and stability when mounting a roll of the laminating film 2.

Accordingly, adjusting the positional fluctuation can be conducted stably and in a prescribed amount of compensation without conducting unstable and uncertain compensation drawn on personal experience.

According to the present invention, a laminating apparatus mounted with an improved mechanism takes effect such that a laminating position of a protective film with respect to a card to be laminated with the protective film is always constant, and positional fluctuation of the protective film is made to be minimized.

While the invention has been described above with reference to specific embodiments thereof, it is apparent that many changes, modifications and variations in the arrangement of equipment and devices can be made without departing from the invention concept disclosed herein.

For instance, it is exemplified in the embodiments of the present invention that a motor is controlled through a servo circuit. However, by using a stepping motor, it should be understood that a CPU could directly control such a stepping motor without using a servo circuit.

Further, with respect to information to be recorded or printed on a surface of a card, it should be understood that such information was a letter including a numeric character or a sign and an image including hologram.

Furthermore, with respect to a method of recording information on a card, printing is a typical example. However, it should be understood that there existed various kinds of recording method.

In addition thereto, in the first and second embodiments of the present invention, it is described that the card 1 is inserted into the laminating apparatus through the card intake slot 101 or 51. However, the structure of inserting the card 1 is not limited to the specific structure described in the embodiments. It is acceptable for the card inserting structure that a holder containing a plurality of cards 1 is loaded into the laminating apparatus as a card supplying device. In this connection, it should be understood that the laminating apparatus according to the present invention was just required for being installed with a card supplying device having a function of supplying a card to the laminating apparatus such as an inserting slot and a holder containing a plurality of cards.

It will be apparent to those skilled in the art that various modification and variations could be made in the present invention without departing from the scope or spirit of the invention.

What is claimed is:

1. A laminating apparatus mounted with an improved mechanism comprising:
   (a) a thermo compression bonding section,
      wherein the thermo compression bonding section pulls a laminating film having a member for forming a protective film out from a roll of the laminating film, which is wrapped around a core bobbin in a cylindrical shape, and overlaps the protective film on one surface of a card and thermally compresses the protective film against the one surface of the card so as to be bonded;

(b) a first bobbin holder, the first bobbin holder including
  (1) a reel shaft,
  (2) a fixed section having a plurality of contacting surface sections, which is fixed to the reel shaft, wherein the plurality of contacting surface sections are formed on the fixed section in different positions in the circumferential direction at an equal angular interval in a direction along the reel shaft,
  (3) a movable section having positioning protrusions, wherein the positioning protrusions can selectively contact with one of the plurality of contacting surface sections of the fixed section by rotating the movable section around the reel shaft so as to be movable along the reel shaft, and further having a flange section provided with a contacting surface, which enables contact with one end portion of the core bobbin, and
  (4) a mechanism, which links the movable section to the fixed section and is capable of controlling positional fluctuation of a protective film to be bonded on a card; and (c) a second bobbin holder, the second bobbin holder including
  (1) a shaft, and
  (2) a holder section, which is movable along the shaft and braced up toward the movable section,
wherein the first and second bobbin holders support the core bobbin at both end portions respectively so as to be rotatable around an axis of revolution of the core bobbin, and
wherein the core bobbin is supported by the movable section and the holder section with being sandwiched between them while the one end portion of the core bobbin contacts the contacting surface of the flange section of the movable section.

2. The laminating apparatus as claimed in claim 1, wherein the mechanism transmits revolution of the fixed section to the movable section and results in rotating the core bobbin.

* * * * *